(12) United States Patent
Nemoto et al.

(10) Patent No.: US 7,672,577 B2
(45) Date of Patent: *Mar. 2, 2010

(54) LOCK MECHANISM FOR STAGE APPARATUS

(75) Inventors: Satoru Nemoto, Saitama (JP); Ken Hirunuma, Tokyo (JP); Shuzo Seo, Saitama (JP)

(73) Assignee: HOYA Corporation, Tokyo (JP)

( * ) Notice: Subject to any disclaimer, the term of this patent is extended or adjusted under 35 U.S.C. 154(b) by 704 days.

This patent is subject to a terminal disclaimer.

(21) Appl. No.: 11/539,188

(22) Filed: Oct. 6, 2006

(65) Prior Publication Data

US 2007/0093108 A1      Apr. 26, 2007

(30) Foreign Application Priority Data

Oct. 6, 2005   (JP)   ............................. 2005-294091
Oct. 6, 2005   (JP)   ............................. 2005-294093

(51) Int. Cl.
    *G03B 17/00*     (2006.01)
(52) U.S. Cl. ..................... 396/55; 292/150; 33/1 M
(58) Field of Classification Search ................... 396/55; 292/150; 33/1 M
    See application file for complete search history.

(56) References Cited

U.S. PATENT DOCUMENTS 6,397,646 B1 *  6/2002  Doong ...................... 70/279.1

FOREIGN PATENT DOCUMENTS

JP          3431020          5/2003

OTHER PUBLICATIONS

U.S. Appl. No. 11/539,186 to Hirunuma et al., filed Oct. 6, 2006.
U.S. Appl. No. 11/539,193 to Hirunuma et al., filed Oct. 6, 2006.

* cited by examiner

*Primary Examiner*—W. B. Perkey
*Assistant Examiner*—Fang-Chi Chang
(74) *Attorney, Agent, or Firm*—Greenblum & Bernstein P.L.C.

(57) ABSTRACT

A lock mechanism for a stage apparatus, includes a movable stage provided on a stationary member which is movable in a reference plane; a pair of engaging members which are provided on the movable stage; a pair of lock members which are positioned between the engaging members and are movable so as to move toward and away from corresponding the engaging members; a lock driving device which moves the lock members to an engaged position wherein the lock members mutually move away from each other and engage with the corresponding engaging members; and an unlock driving device which moves the lock members to a disengaged position wherein the lock members mutually move toward each other so as to disengage with the corresponding engaging members.

21 Claims, 28 Drawing Sheets

LOCK MECHANISM FOR STAGE APPARATUS

BACKGROUND OF THE INVENTION

1. Field of the Invention

The present invention relates to a lock mechanism for a stage apparatus which locks a movable stage of the stage apparatus in a non-operational state when the movable stage, which is freely movable along a specific plane, is in a non-operational state.

2. Description of the Prior Art

An example of a lock mechanism for a movable stage, the movable stage being movable in a specific X-direction and a Y-direction orthogonal to the X-direction and to which an image pickup device is fixed on a front surface thereof, is disclosed in Japanese Patent No. 3431020. The lock mechanism disclosed therein is provided with one cylindrical boss projecting from the back surface of a movable stage, and first and second abutting members provided behind the movable stage on mutually opposing sides of the cylindrical boss. The first and second abutting members are movable in a direction parallel to the movable stage.

When the movable stage is in a non-operational state where no hand-shake correction is performed, the first abutting member and the second abutting member mutually move toward a locked position. Accordingly, since approximately half-circle shaped engaging recesses, respectively formed on opposing surfaces of the first and second abutting members, clasp the cylindrical boss, the movable stage is locked by the first and second abutting members.

Since the above described lock mechanism is a construction whereby one cylindrical boss is clasped by the approximately half-circle shaped engaging recesses of the first and second abutting members, the movable stage cannot be securely locked without the first and second abutting members contacting the cylindrical boss with a strong force.

However, in order for the first and second abutting members to contact the cylindrical boss with a strong force, the size of the driving device of the lock mechanism needs to be increased, which undesirably increases the size of the lock mechanism and the stage apparatus.

Furthermore, in the case where this lock mechanism of the prior art is applied to a camera-shake (hand-shake) correction apparatus which corrects 'rotational shake', an additional problem occurs. Namely, in this kind of camera-shake correction apparatus, the stage is rotatable. However, in the above described lock mechanism of the prior art, since there is only one boss (i.e., the cylindrical boss), even if the first and second abutting members clasp this boss, the movable stage cannot be locked so as to be prevented from being rotated.

SUMMARY OF THE INVENTION

The present invention provides a lock mechanism for a stage apparatus which has a simple structure, can securely lock a movable stage thereof without requiring a large driving force, and can prevent the movable stage from being rotated.

According to an aspect of the present invention, a lock mechanism for a stage apparatus is provided, including a movable stage which is provided on a stationary member which is movable in a reference plane; a pair of engaging members which are provided on the movable stage; a pair of lock members which are positioned between the engaging members and are movable so as to move toward and away from corresponding the engaging members; a lock driving device which moves the lock members to an engaged position wherein the lock members mutually move away from each other and engage with the corresponding engaging members; and an unlock driving device which moves the lock members to a disengaged position wherein the lock members mutually move toward each other so as to disengage with the corresponding engaging members.

It is desirable for the lock members to be movable in a direction along a straight line passing through both of the engaging members.

It is desirable for the lock mechanism to include an interconnecting device which interconnects the lock members with each other, wherein the interconnecting device moves one of the lock members to the engaged position when the other of the lock members moves to the engaged position, and moves the one of the lock members to the disengaged position when the other of the lock members moves to the disengaged position.

It is desirable for the interconnecting device to include a link member which is rotatable on an axis extending normal to the reference plane; and a pair of mounting axes which extend normal to the reference plane, wherein one and the other end portions of the link member are mutually and rotatably mounted to the one and the other the lock members via the mounting axes, respectively.

It is desirable for the interconnecting device to include a pair of cam slots respectively formed in the one and the other lock members, wherein at least a portion of the pair of cam slots overlap each other in a direction normal to the reference plane; and a cam pin which is slidably inserted through both of the pair of cam slots so as to be relatively movable therein.

It is desirable for the interconnecting device to include a pair of racks which are respectively formed on one and other of facing edges of the one and the other lock members, the pair of racks extending in directions parallel to the moving direction of the lock members; and a pinion gear which is rotatable on an axis extending normal to the reference plane and meshes with the pair of racks.

It is desirable for the lock driving device to include a magnetic-force generator provided on the stationary member; a drive coil fixed to each of the lock members, respectively, wherein upon receiving electric current while receiving a magnetic force from the magnetic-force generator, each drive coil generates a linear drive force in a direction along a straight line passing through both of the engaging members.

It is desirable for the lock driving device to include a magnetic-force generator provided on the stationary member; at least one drive coil fixed to at least one of the lock members, respectively, wherein upon receiving electric current while receiving a magnetic force from the magnetic-force generator, the drive coil generates a linear drive force in a direction along a straight line passing through both of the engaging members.

It is desirable for the unlock driving device to include a biasing device which exerts a biasing force on the lock members toward the disengaged position.

It is desirable for the lock mechanism for the stage apparatus to include a first retaining device for holding the lock members at the engaged position upon the lock members being moved to the engaged position, and a second retaining device for holding the lock members at the disengaged position upon the lock members being moved to the disengaged position.

It is desirable for the first retaining device to include a plunger provided therein with an electromagnet and a permanent magnet; wherein when the movable stage is in a non-operational state, the lock members are held at the engaged position by a magnetic force from the permanent magnet; and when the movable stage is in an operational state, the magnetic force of the permanent magnet is cancelled out by a magnetic force of the electromagnet.

It is desirable for the second retaining device to include a biasing device which exerts a biasing force on the lock members toward the disengaged position.

It is desirable for the pair of engaging members to be provided on the movable stage at positions aligned on a straight line which passes through a center of gravity of an integral movable body which includes the movable stage and other members integral therewith.

It is desirable for the stage apparatus to be provided in a digital camera and the movable stage to be provided on a front surface thereof with a rectangular shaped image pickup device. The pair of engaging members are provided on the movable stage so as to be aligned on a substantially diagonal line which extends across the rectangular shaped image pickup device.

It is desirable for the lock mechanism for the stage apparatus to include at least another engaging member provided on the movable stage in addition to the pair of engaging members; wherein the pair of lock members are positioned between the pair of engaging members and the another engaging member, and are provided with lock-engaging grooves for engaging and disengaging with corresponding each of the pair of engaging members and the another engaging member; and the number of the lock-engaging grooves corresponds with a total number of the pair of engaging members and the another engaging member.

In an embodiment, a lock mechanism for a stage apparatus is provided, including a movable stage which is provided on a stationary member which is movable in a reference plane; a pair of engaging members which are provided on the movable stage; a pair of lock members provided in between the engaging members, the lock members being movable in a direction along a straight line passing through both of the engaging members, wherein the lock members include a pair of engaging portions which disengageably engage with corresponding engaging members; a lock driving device which moves the lock members to an engaged position wherein the lock members mutually move away from each other and engage with the corresponding engaging members upon the movable stage entering a non-operational state; and an unlock driving device which moves the lock members to a disengaged position wherein the lock members mutually move toward each other so as to disengage with the corresponding engaging members so that the movable stage enters an operational state. One of the engaging portions includes a resilient engaging portion which is resiliently deformable, wherein when the movable stage is in the non-operational state, a distance from the resilient engaging portion to a corresponding the engaging member is shorter than a distance between the engaged position and the disengaged position. Upon an operation of the lock driving device, the resilient engaging portion engages with the corresponding engaging member while resiliently deforming.

It is desirable for the resilient engaging portion to include a movable engaging portion which disengageably engages with the corresponding engaging member, the movable engaging portion being supported on the lock member via a resilient member.

It is desirable for the lock mechanism for the stage apparatus to include an interconnecting device which interconnects the lock members with each other, wherein the interconnecting device moves one of the lock members to the engaged position when the other of the lock members moves to the engaged position, and moves the one of the lock members to the disengaged position when the other of the lock members moves to the disengaged position.

It is desirable for the interconnecting device to include a pair of racks which are respectively formed on one and other of facing edges of the one and the other lock members, the pair of racks extending in directions parallel to the moving direction of the lock members; and a pinion gear which is rotatable on an axis extending normal to the reference plane and meshes with the pair of racks.

It is desirable for the lock driving device to include a magnetic-force generator provided on the stationary member; and at least one drive coil fixed to at least one of the lock members, wherein upon receiving electric current while receiving a magnetic force from the magnetic-force generator, the drive coil generates a linear drive force in a direction along a straight line passing through both of the engaging members.

It is desirable for the lock mechanism for the stage apparatus to include a first retaining device for holding the lock members at the engaged position upon the lock members being moved to the engaged position, and a second retaining device for holding the lock members at the disengaged position upon the lock members being moved to the disengaged position.

According to the present invention, since the pair of lock members lock-engage with the pair of engaging members so as to support (push against) the engaging members in opposite outward directions when the movable stage is in a non-operational state, the movable stage can be locked at a predetermined position securely without requiring a very strong force. Furthermore, since the pair of engaging members are lock-engaged by the pair of lock members, the rotatable movable stage can be locked into a state so as to be prevented from being rotated.

Furthermore, since the pair of lock members are positioned in between the pair of engaging members, the lock mechanism can be miniaturized.

Furthermore, since a resilient engaging portion is provided on a lock member, and since an engaging member is lock-engaged via this resilient engaging portion, even if the position of the engaging members are slightly out of alignment compared to the positions determined at the design stage, each lock member is securely engaged with each engaging member, respectively, upon the lock members being moved to the engaged positions thereof.

The present disclosure relates to subject matter contained in Japanese Patent Application Nos. 2005-294091 and 2005-294093 (both filed on Oct. 6, 2005) which are expressly incorporated herein in their entireties.

BRIEF DESCRIPTION OF THE DRAWINGS

The present invention will be discussed below in detail with reference to the accompanying drawings, in which.

DESCRIPTION OF THE PREFERRED EMBODIMENTS

A first embodiment of the present invention will be described hereinafter with reference to FIGS. 1 through 12. In the following description, as shown by the arrows in FIGS. 1 and 2, the left/right direction, the upward/downward direction, and the forward/rearward direction of a camera-shake correction apparatus (hand-shake correction apparatus/ stage apparatus) 30 is defined as the X-direction, the Y-direction and the Z-direction, respectively.

Firstly the camera-shake correction apparatus 30, which has a lock mechanism 100 of the present invention installed therein, will be described.

Figure 1:
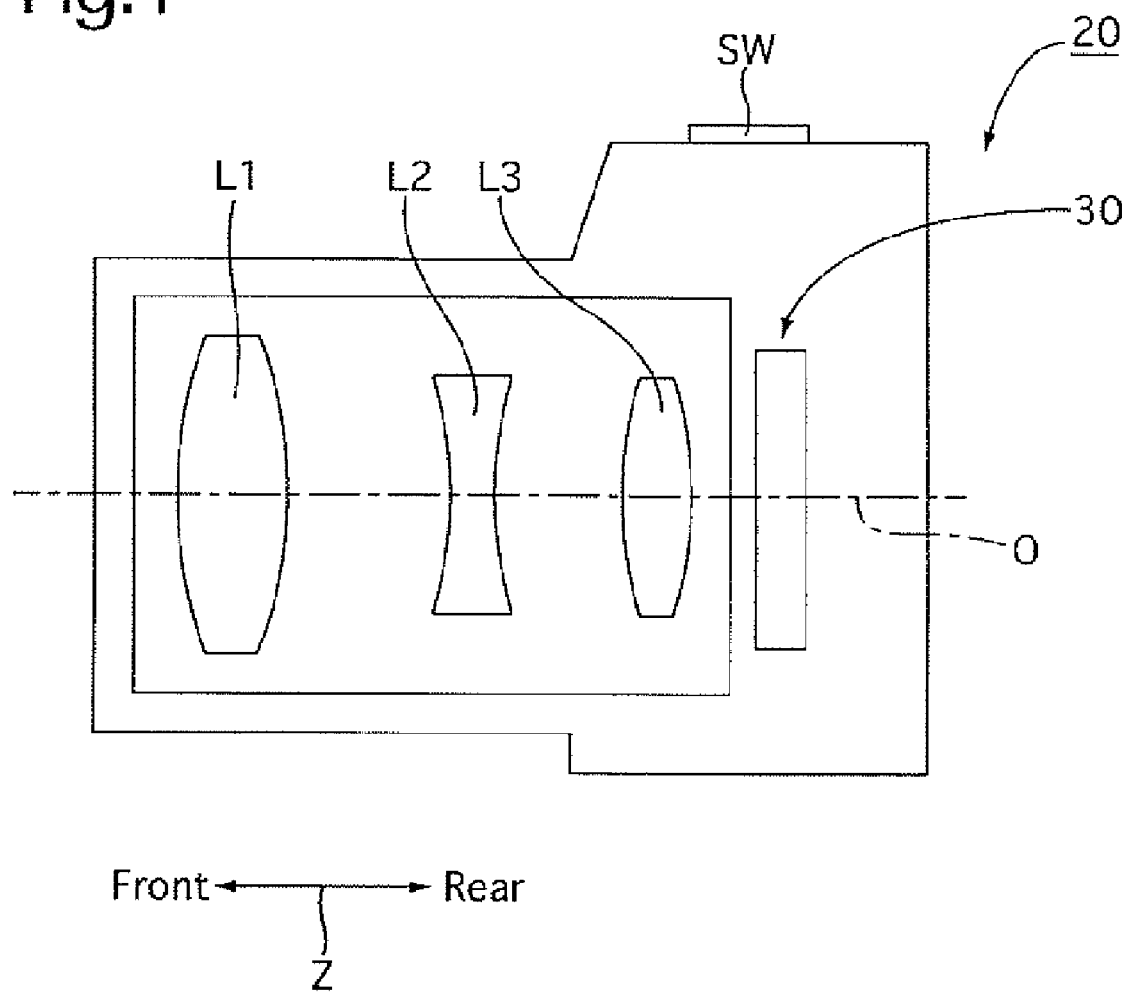
FIG. 1 is a longitudinal sectional view of a digital camera having installed therein a camera-shake correction apparatus according to a first embodiment of the present invention.

As shown in FIG. 1, an optical system having first, second and third lens groups L1, L2 and L3, is provided in a digital camera 20, and the camera-shake correction apparatus 30 is provided behind the third lens group L3.

Figure 2:
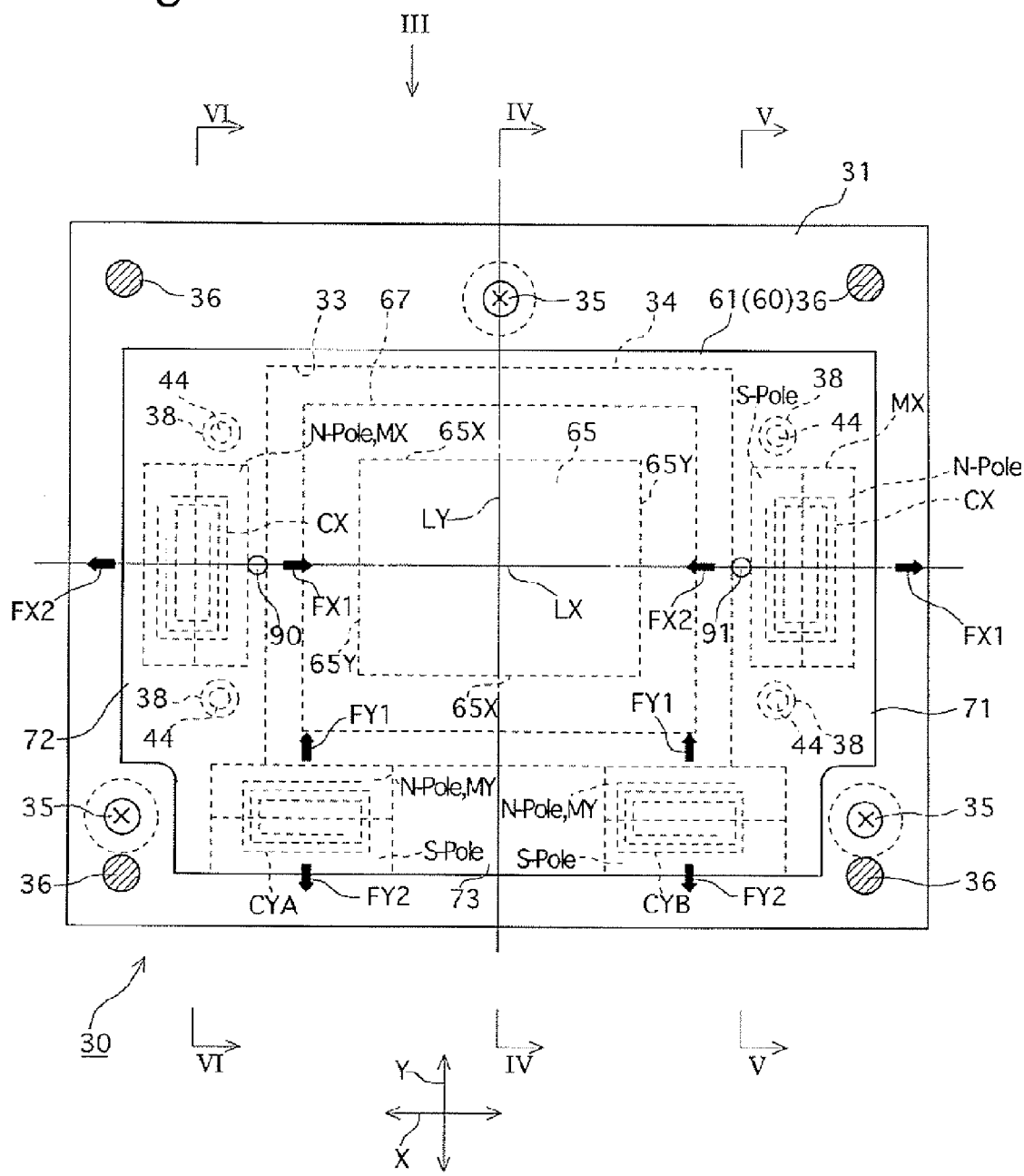
FIG. 2 is a rear view of the camera-shake correction apparatus with the rear plate omitted for clarity.

The camera-shake correction apparatus 30 has a construction as shown in FIGS. 2 through 6. As shown in FIGS. 2 through 6, the camera-shake correction apparatus 30 is provided with a front stationary support board 31 (stationary member)r which has a horizontal rectangular shape (as viewed from the front thereof) and is made from a magnetic material such as a soft iron, and a rear stationary support board 32 (stationary member) having the same size and shape as that of the front stationary support board 31 and is also made from a magnetic material such as a soft iron. The front stationary support board 31 and the rear stationary support board 32 are connected to each other in the vicinity of the four corners at the opposing surfaces thereof by four support cylindrical columns 36, respectively, which extend in the forward/rearward direction (Z-direction). The front stationary support board 31 and the rear stationary support board 32 that are thus connected to each other are parallel to each other. The front stationary support board 31 is provided in a central portion thereof with a rectangular mounting hole (through-hole) 33 in which a transparent infrared-cut filter 34 having the same rectangular shape as the rectangular mounting hole 33 is fitted to be mounted thereto. As shown in FIG. 2, through-holes are formed in the front stationary support board 31 at three different positions, and three set screws 35 are inserted into the three through holes, respectively. The three set screws 35 are screwed into three female screw holes (not shown) formed on an inner surface of a camera body of the digital camera 20, so that the inclination angle of the front stationary support board 31 with respect to the camera body is adjusted by adjusting the amount of engagement of the three set screws 35 with the female screw holes.

The front stationary support board 31 is provided, on the rear surface thereof at four positions thereon, with four cylindrical support projections 38, respectively, which project rearward. A front half portion of each of four metal balls 44 is rotatably supported in a hemispherical recess (not shown) formed in a rear end of each of the four cylindrical support projections 38, respectively. Four support projections 47 are formed on the rear stationary support board 32 at four positions thereon aligned with the four cylindrical support projections 38, respectively, so as to extend mutually towards each other, respectively, in the forward/rearward direction (Z-direction). A rear half portion of each of four metal balls 52 is rotatably supported in a hemispherical recess (not shown) formed in a front end of each of the four cylindrical support projections 47, respectively.

The camera shake correction apparatus 30 is provided, on the rear surface of the front stationary support board 31 at opposite ends thereof in the left/right direction, with two X-direction magnets MX which are secured to the rear surface of the front stationary support board 31 so that an S-pole and an N-pole of each X-direction magnet MX are aligned in the X-direction. The two X-direction magnets MX are aligned in the X-axis direction and the positions of the two X-direction magnets MX in the Y-axis direction are the same. Two X-direction magnetic circuits are formed between the two X-direction magnets MX and two portions of the rear stationary support board 32 which face the two X-direction magnets MX in the forward/rearward direction, respectively, due to the magnetic flux of the two X-direction magnets MX passing through the front stationary support board 31 and the rear stationary support board 32. Namely, the front stationary support board 31 and the rear stationary support board 32 function as yokes.

Figure 4:
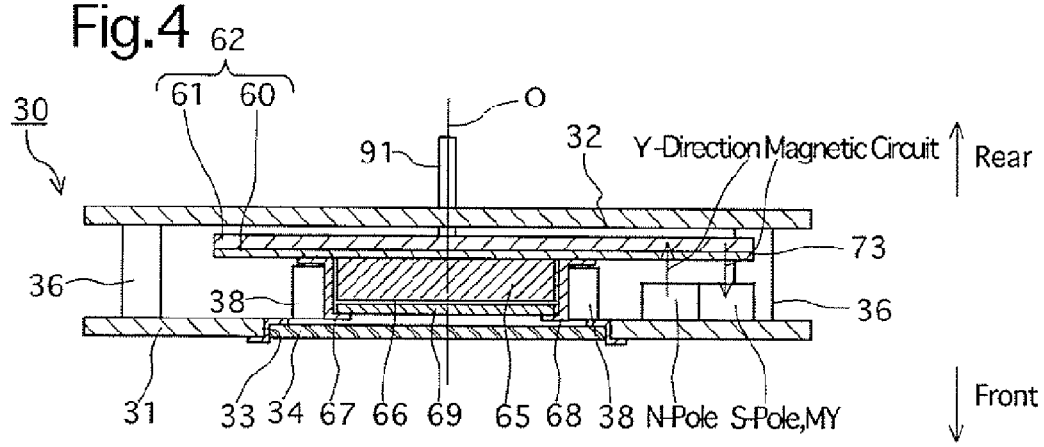
FIG. 4 is a cross sectional view of the camera-shake correction apparatus taken along the IV-IV line shown in FIG. 2.
Figure 5:
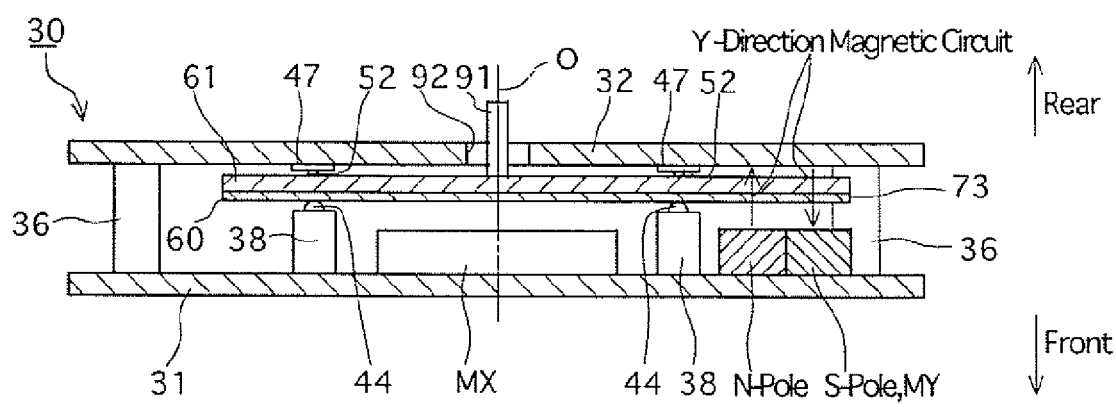
FIG. 5 is a cross sectional view of the camera-shake correction apparatus taken along the V-V line shown in FIG. 2.
Figure 6:
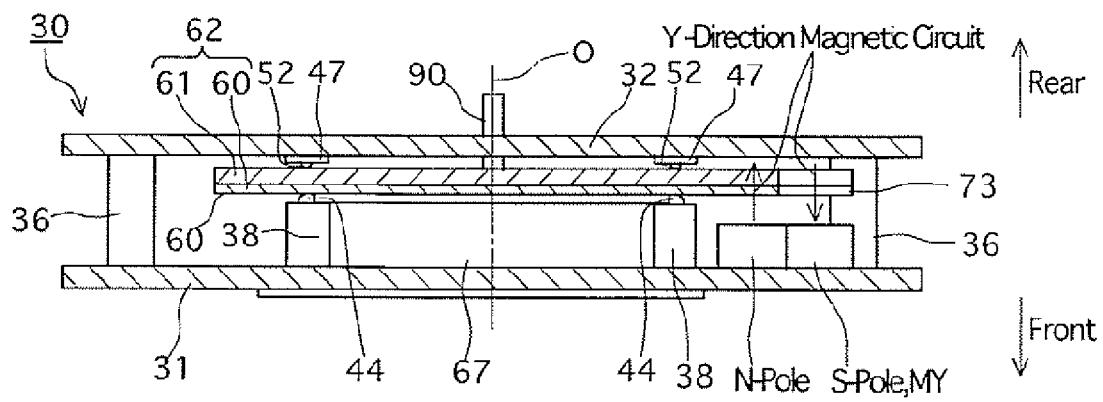
FIG. 6 is a cross sectional view of the camera-shake correction apparatus taken along the VI-VI line shown in FIG. 2.

The camera shake correction apparatus 30 is provided, on the rear surface of the front stationary support board 31 at a lower end thereof, with two Y-direction magnets (left and right Y-direction magnets) MY which are secured to the rear surface of the front stationary support board 31 so that an S-pole and an N-pole of each Y-direction magnet MY are aligned in the Y-direction. The two Y-direction magnets MY are aligned in the X-axis direction and the positions of the two Y-axis-direction magnets MY in the Y-axis direction are the same. As shown in FIGS. 4 through 6, two Y-axis-direction magnetic circuits are formed between the two Y-direction magnets MY and two portions of the rear stationary support board 32 which face the two Y-direction magnets MY in the forward/rearward direction, respectively, due to the magnetic flux of the two Y-direction magnets MY passing through the front stationary support board 31 and the rear stationary support board 32. Namely, the front stationary support board 31 and the rear stationary support board 32 function as yokes.

The camera shake correction apparatus 30 is provided with an electrical board 60, which is a flat rectangular board, and a reinforcing plate 61 having the same shape as the electrical board 60 as viewed from the front and is fixed to the back of the electrical board 60 to be integral therewith so that the electrical board 60 and the reinforcing plate 61 constitute a movable stage 62. As shown in FIGS. 3 through 6, the four metal balls 44 are in contact with the front surface of the electrical board 60 (i.e., the front surface of the movable stage 62) at four points to be freely rotatable thereat, and the four metal balls 52 are in contact with the rear surface of the reinforcing plate 61 (i.e., the rear surface on the movable stage 62) at four points to be freely rotatable thereat. In other words, the movable stage 62, which is constructed from the electrical board 60 and the reinforcing plate 61, is held between the four metal balls 44 and the four metal balls 52 in the forward/rearward position, and the movable stage 62 is provided orthogonal to the optical axis O of the optical system having the first, second and third lens groups L1, L2 and L3 (and the movable stage 62 is parallel to the front and rear stationary support boards 31 and 32).

Accordingly, the movable stage 62 is movable in an X-Y plane parallel to both the X-direction and the Y-direction (i.e., orthogonal to the optical axis O) relative to the front stationary support board 31 and the rear stationary support board 32 from the initial position shown in FIG. 2. In addition, the electrical board 60 (of the movable stage 62) and the front stationary support board 31 are provided with a common moving range limiting device (not shown) which limits the range of movement of the movable stage 62 relative to the front stationary support board 31 to a predetermined range of movement. For example, the common moving range limiting device can be constructed from holes provided in one of the movable stage 62 and the front stationary support board 31 and corresponding projections, which extend through the holes, provided in the other of the movable stage 62 and the front stationary support board 31.

A CCD (image pickup device) 65 is fixed to a front surface of the electrical board 60 at the center thereof. As shown in FIG. 2, the CCD 65 is in the shape of a rectangle as viewed from the front thereof. The CCD 65 is provided with a pair of X-direction edges (upper and lower X-direction edges) 65X which extend parallel to each other in the X-direction and a pair of Y-direction edges (right and left Y-direction edges) 65Y which extend parallel to each other in the Y-direction, in the state shown in FIG. 2 in which the electrical board 60 (movable stage 62) is in the initial position thereof.

A CCD holder 67 which surrounds the CCD 65 is fixed to the front of the electrical board 60 in an airtight fashion (dust-tight fashion). The CCD holder 67 is provided on a front wall thereof with an aperture 68 having a rectangular shape as viewed from the front of the camera shake correction apparatus 30. An optical low-pass filter 69 is installed in the internal space of the CCD holder 67 to be fixedly fitted therein between the front wall of the CCD holder 67 and the CCD 65. The space between the optical low-pass filter 69 and the front wall of the CCD holder 67 is maintained in an air-tight state. An imaging surface 66 of the CCD 65 faces the optical low-pass filter 69. The CCD 65, the optical low-pass filter 69, the aperture 68 and the infrared-cut filter 34 are aligned in the forward/rearward direction at all times. Object light which is passed through the lenses L1, L2 and L3, the infrared-cut filter 34 and the optical low-pass filter 69, is formed as an object image on the imaging surface 66 of the CCD 65. When the electrical board 60 (movable stage 62) is in the initial position (when the electrical board 60 is in the state shown in FIG. 2), the center of the imaging surface 66 of the CCD 65 is positioned on the optical axis O.

As shown in FIG. 2, the electrical board 60 is provided at horizontally opposite ends thereof with a right tongue portion 71 and a left tongue portion 72 which extend rightward and leftward, respectively, and is further provided at a lower end of the electrical board 60 with a lower tongue portion 73 which extends downward.

The right tongue portion 71 and the left tongue portion 72 are positioned to correspond to the aforementioned two X-direction magnetic circuits, respectively (i.e., positioned to face the two x-direction magnets MX in the forward/rearward direction, respectively).

Two planar X-direction drive coils CX having the same specifications are printed on the front surfaces of the right tongue portion 71 and the left tongue portion 72, respectively. The two X-direction drive coils CX lie in a plane parallel to an X-Y plane, are each wound in a coiled shape by over one hundred turns (i.e., are wound in both a direction parallel to the electrical board 60 and in a thickness direction of the electrical board 60), and are aligned in a direction parallel to the pair of X-direction edges 65X of the CCD 65 (in the X-direction in the state shown in FIG. 2). In other words, the positions of the two X-direction drive coils CX are coincident with each other in the direction parallel to the pair of Y-direction edges 65Y (in the Y-direction in the state shown in FIG. 2).

Accordingly, the two X-direction drive coils CX, the front stationary support board 31, the rear stationary support board 32, and the two X-direction magnets MX constitute an X-direction driving device.

As shown in FIGS. 4 through 6, the lower tongue portion 73 is positioned to correspond to the aforementioned two Y-direction magnetic circuits, respectively (i.e., positioned to face the two Y-direction magnets MY in the forward/rearward direction, respectively).

Two planar Y-direction drive coils CYA and CYB having the same specifications are printed on the front surface of the lower tongue portion 73. The two Y-direction drive coils CYA and CYB lie in a plane parallel to the X-Y plane, are each wound in a coiled shape by over one hundred turns (i.e., are wound in both a direction parallel to the electrical board 60 and in a thickness direction of the electrical board 60), and are aligned along the lower X-direction edge 65X of the CCD 65 (in the X-direction in the state shown in FIG. 2). In other words, the positions of the two Y-direction drive coils CYA and CYB are coincident with each other in the direction parallel to the pair of Y-direction edges 65Y (in the Y-direction in the state shown in FIG. 2).

Accordingly, the two Y-direction drive coils CYA and CYB, the front stationary support board 31, the rear stationary support board 32, and the two Y-direction magnets MY constitute an Y-direction driving device.

The two X-direction drive coils CX, and the two Y-direction drive coils CYA and CYA are electrically connected to a controller constructed from a CPU, etc., provided inside the digital camera 20.

The camera-shake correction apparatus 30 carries out camera-shake (hand-shake) correction operations via the controller supplying electric current to the two X-direction drive coils CX, and the two Y-direction drive coils CYA and CYB.

In other words, if electric current is supplied to the X-direction drive coils CX, a linear drive force in either direction FX1 or direction FX2 occurs in the X-direction drive coils CX, as shown in FIG. 2. Similarly, if electric current is supplied to the Y-direction drive coils CYA and CYB, a linear drive force in the either direction FXY or direction FY2 occurs in the Y-direction drive coils CYA and CYB.

As is commonly known in the art, when a camera body is shaked/vibrated in the X-direction or the Y-direction due to hand-shake (camera shake), the amount of movement of the camera body (amount of hand-shake) in the X-direction and the Y-direction is detected, and it the CCD 65 is linearly moved with respect to the camera body by the same amount as the detected amount of hand-shake but in the opposite direction, the hand-shake (camera-shake/image-shake) of the CCD 65 is corrected. Accordingly, in order for the CCD 65 to be linearly moved in such a manner, if electric current is supplied from the controller to the two X-direction drive coils CX, and the two Y-direction drive coils CYA and CYB, camera-shake applied to the CCD 65 in the K-direction and Y-direction is corrected.

Furthermore, since the movable stage 62 (CCD 65) is relatively rotatable with respect to the front stationary support board 31 and the rear stationary support board 32, if the direction of the electric current supplied to the Y-direction drive coil CYA and the Y-direction drive coil CYB are made mutually opposite, so that mutually opposite driving forces occur between the Y-direction drive coil CYA and the Y-direction drive coil CYB, the movable stage 62 (CCD 65) is rotated. Accordingly, if electric current is supplied from the controller to the Y-direction drive coil CYA and the Y-direction drive coil CYB so that the movable stage 62 (CCD 65) is rotated in a rotational direction opposite to the rotational direction of the camera shake, rotational camera-shake can be corrected.

The lock mechanism 100 of the first embodiment to which the present invention is applied and is installed in the camera-shake correction apparatus 30 will be described hereinafter with reference to FIGS. 7 through 12.

Figure 3:
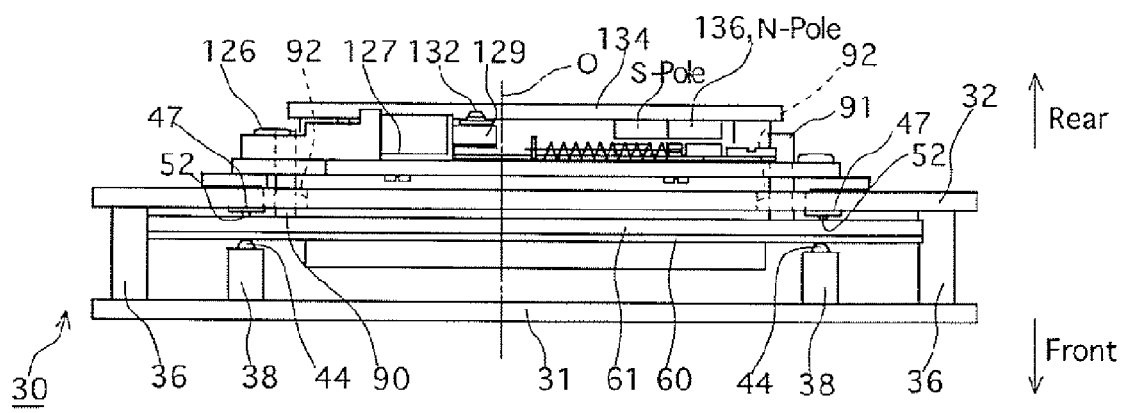
FIG. 3 is a plan view of the camera-shake correction apparatus, as viewed in the direction of the arrow III shown FIG. 2.

As shown in FIGS. 2 through 4, engaging pins (engaging members) 90 and 91 are provided on the back surface of the reinforcing plate 61 of the movable stage 62 so as to project rewards therefrom and so as to be aligned on the X-direction line LX which passes through the center of gravity of an integral movable body which includes the movable stage 62 and other members integral therewith (the CCD 65, the CCD holder 67, engaging pins 90 and 91, etc.) and are provided at symmetrical positions with respect to a Y-direction line LY with passes through the center of gravity of the integral movable body, with the camera-shake correction apparatus 30 in the initial state shown in FIG. 2. Furthermore, the rear stationary support board 32 is provided with insertion holes (square through-holes) 92 which are likewise formed at positions symmetrical to the Y-direction Line LY and aligned on the X-direction line LX, i.e., are formed at positions corresponding to the engaging pins 90 and 91. The engaging pins 90 and 91 are inserted through the insertion holes 92, respectively, so as to extend therethrough so that the rear end portions of the engaging pins 90 and 91 project rearwards from the rear stationary support board 32.

A front yoke 101, which is a flat plate extending parallel to the rear stationary support board 32, is made from a magnetic material such as soft iron and is fixed to the rear surface of the rear stationary support board 32 by a plurality of mounting screws 102. The front yoke 101 is provided, in the vicinity of four corner portions thereof, with four cylindrical support members 103 which all project rearwards from the rear surface of the front yoke 101. Each of the cylindrical support members 103 has a female screw-hole 104 formed therein. A pair of left and right square holes 105, which are through-holes having a substantially square shape, are provided on left and right sides of the front yoke 101 at positions corresponding to the left and right insertion holes 92. The engaging pins 90 and 91 not only extend through the left and right insertion holes 92, but also extend through the left and right square holes 105, respectively. Furthermore, left and right pairs of screw holes 107 which are vertically aligned are formed on the left and right sides of the front yoke 101. A pair of screw holes 108, which are vertically aligned, and a pair of screw holes 109, which are vertically aligned, are formed in a central portion of the front yoke 101.

A pair of left and right lock members 110 and 111 are flat plate members which are both provided parallel to the rear stationary support board 32, are slidably movable in the x-direction on a plane parallel to the front yoke 101, and are positioned in between the engaging pins 90 and 91. The lock members 110 and 111 have the same shape, but have the opposite vertical orientation. The lock members 110 and 111 are each provided with a recess 112 and an inward projection 113 which are formed at inward facing portions of the lock-members 110 and 111 in the left/right direction. Each of the lock members 110 and 111 is provided, on an outer edge thereof, with a pair of upper and lower outward projections 114, and an engaging recess 115 provided between the upper and lower outward projections 114. Furthermore, each of the engaging recesses 115 (of the lock members 110 and 111) is provided on an inner edge thereof with an approximately half-circular shaped lock-engaging groove 116. The left and right lock-engaging grooves 116 disengageably engage with the engaging pins 90 and 91, respectively.

The lock member 110, including the inward projection 113 thereof, is provided on the right side portion thereof at two locations with a pair of upper and lower guide slots 118 which extend in the X-direction. Similarly, the lock member 111, including the inward projection 113 thereof, is provided on the left side portion thereof at two locations with a pair of upper and lower guide slots 118 which extend in the X-direction. Furthermore, each outward projection 114 has a guide slot 119 formed therethrough which extends in the X-direction. Mounting screws 120 are inserted through the guide slots 118 and the guide slots 119 from the rear side thereof. The screw portion of each mounting screw 120 is screw-engaged with corresponding screw holes 107, screw holes 108 and screw holes 109 so that the lock member 110 and the lock member 111 are mounted (installed) onto the front yoke 101. Since the diameter of the screw portion of each mounting screw 120 is the same as the vertical widths of the guide slots 118 and guide slots 119, the left and right lock members 110 and 111 are both slidable in the X-direction with respect to the front yoke 101 in accordance with the engaging relationship between the guide slots 118 and 119 and the mounting screws 120, so as to linearly move between the disengaged position shown in FIG. 8 and the engaged position shown in FIG. 9. Furthermore, the diameters of the heads of the mounting screws 120 are larger than the vertical widths of the guide slots 118 and guide slots 119, so that the left and right lock members 110 and 111 are sandwiched in a forward/rearward direction between the heads of the mounting screws 120 and the front yoke 101. Accordingly, the heads of the mounting screws 120 prevent the left and right lock members 110 and 111 from coming off the yoke 101, and the front surfaces of the left and right lock members 110 and 111 are always in contact with the rear surface of the yoke 101.

Figure 8:
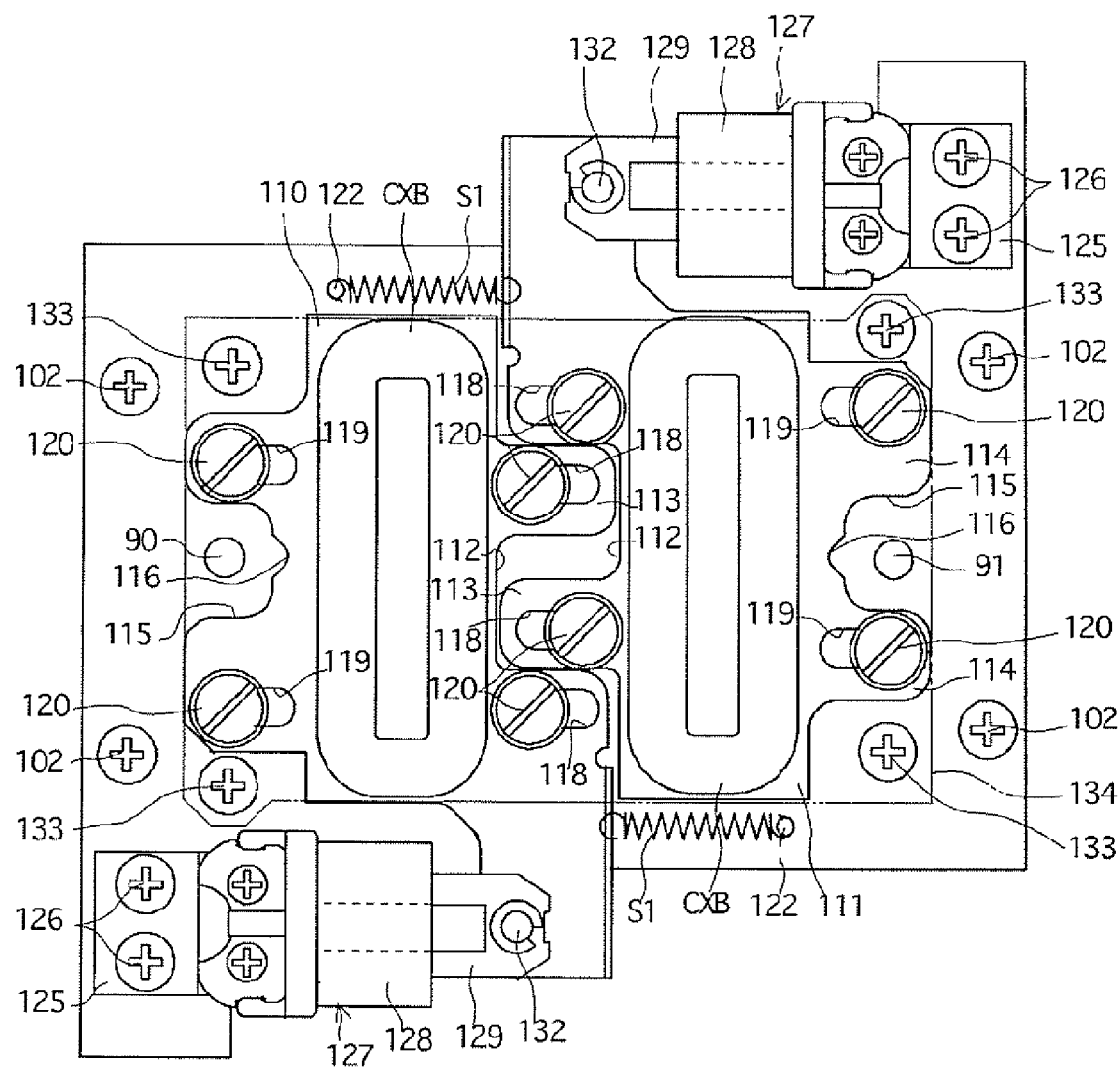
FIG. 8 is a rear view of the lock mechanism in a disengaged state, with a rear yoke omitted for clarity.

When the left and right lock members 110 and 111 are moved to the disengaged position shown in FIG. 8, the left and right lock-engaging grooves 116 are moved in an inward direction away from the engaging pins 90 and 91, respectively.

Figure 9:
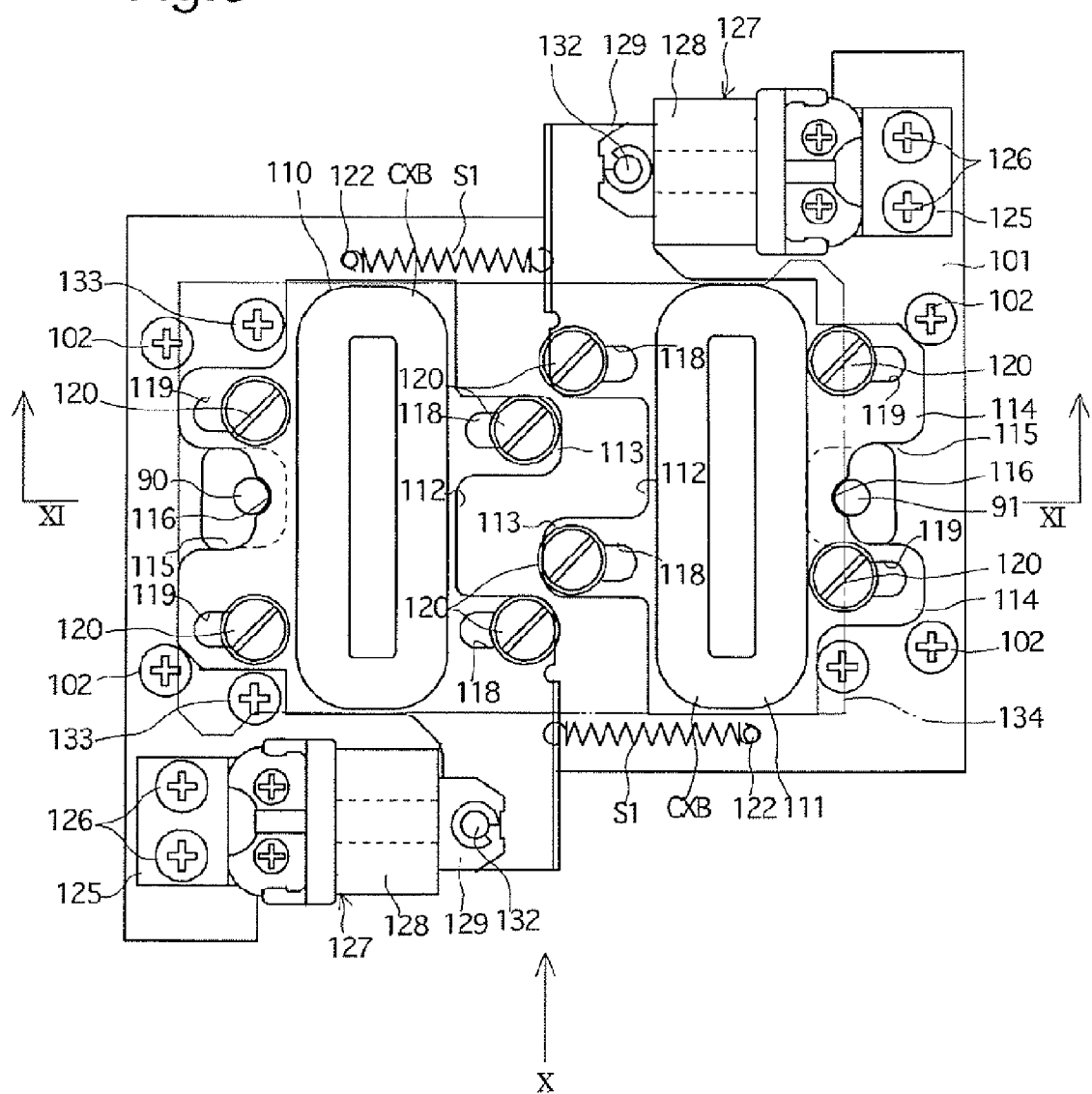
FIG. 9 is a rear view of the lock mechanism in an engaged state, with the rear yoke omitted for clarity.

Conversely, when in the movable stage 62 is in the initial position shown in FIG. 2, if the left and right lock members 110 and 111 are moved to the engaged position shown in FIG. 9, the left and right lock-engaging grooves 116 engage with the engaging pins 90 and 91, respectively.

An X-direction drive coil CXB is fixed to a rear surface of the lock member 110 at an approximately central portion thereof, and an X-direction drive coil CXB is fixed to a rear surface of the lock member 111 at an approximately central portion thereof. Each of the X-direction drive coils CXB is wound in a coiled shape by over one hundred turns (i.e., are wound in both a direction parallel to the lock members 110 and 111 and in a thickness direction of the lock members 110 and 111), and are aligned in a direction parallel to an X-Y plane.

The ends of each of upper and lower (left and right) extension springs (second retaining device/ biasing device/unlock driving device) si are engaged (connected) with engaging holes 121 provided on rearward-extending projections respectively formed on facing edges of the lock members 111 and 110 at upper and lower positions thereof, and with a pair of upper and lower (left and right) spring-hook projections 122 which project rearwards from the rear surface of the front yoke 101 at upper and lower portions thereof (above and below the left and right lock members 110 and 111, respectively). The extension springs S1 bias the lock members 110 and 111 so as to move toward each other to the disengaged position.

Right and left attachment plates 125 are fixed to the top right and bottom left corner portions, respectively, of the rear surface of the yoke 101 via mounting screws 126. Each attachment plate 125 is provided on the rear surface thereof with a conventional electromagnetic plunger (first retaining device) 127 having an electromagnet (coil and iron core) installed therein. Each plunger 127 is provided with a magnetic slide plate 129 formed from a magnetic material which is inserted into a bottomed rectangular-tube shaped plunger body 128 so as to be movable left and right therein in the X-direction. A permanent magnet is also provided inside each plunger body 128 in addition to the above-mentioned electromagnet, so that a major portion of each magnetic slide plate 129 thereof is sunk inside each corresponding plunger body 128 (see FIG. 9) in a fully inward position by the magnetic force of this permanent magnet when electric current is not supplied to the above-mentioned coil of the electromagnet. Conversely, if electric current is supplied to the coil of each electromagnet of each plunger 127, each electromagnet generates a magnetic force strong enough to eliminate (cancel out) the magnetic force of each respective permanent magnet, so that the major portions of the magnetic slide plates 129 mutually move inward so as to further project out from the respective plunger bodies 128 (see FIG. 8). A linkage pin 132 is inserted into a linkage hole 130 provided in the end portion of the magnetic slide plate 129 of the lower left plunger 127 and a linkage hole 131 provided in the lower portion of the lock member 110, and accordingly, the magnetic slide plate 129 and the lock member 110 become integral with each other via the linkage pin 132. Similarly, a linkage pin 132 is inserted into a linkage hole 130 provided in the end portion of the magnetic slide plate 129 of the upper right plunger 127 and a linkage hole 131 provided in the upper portion of the lock member 111, and accordingly, the magnetic slide plate 129 and the lock member 111 become integral with each other via the linkage pin 132.

Figure 7:
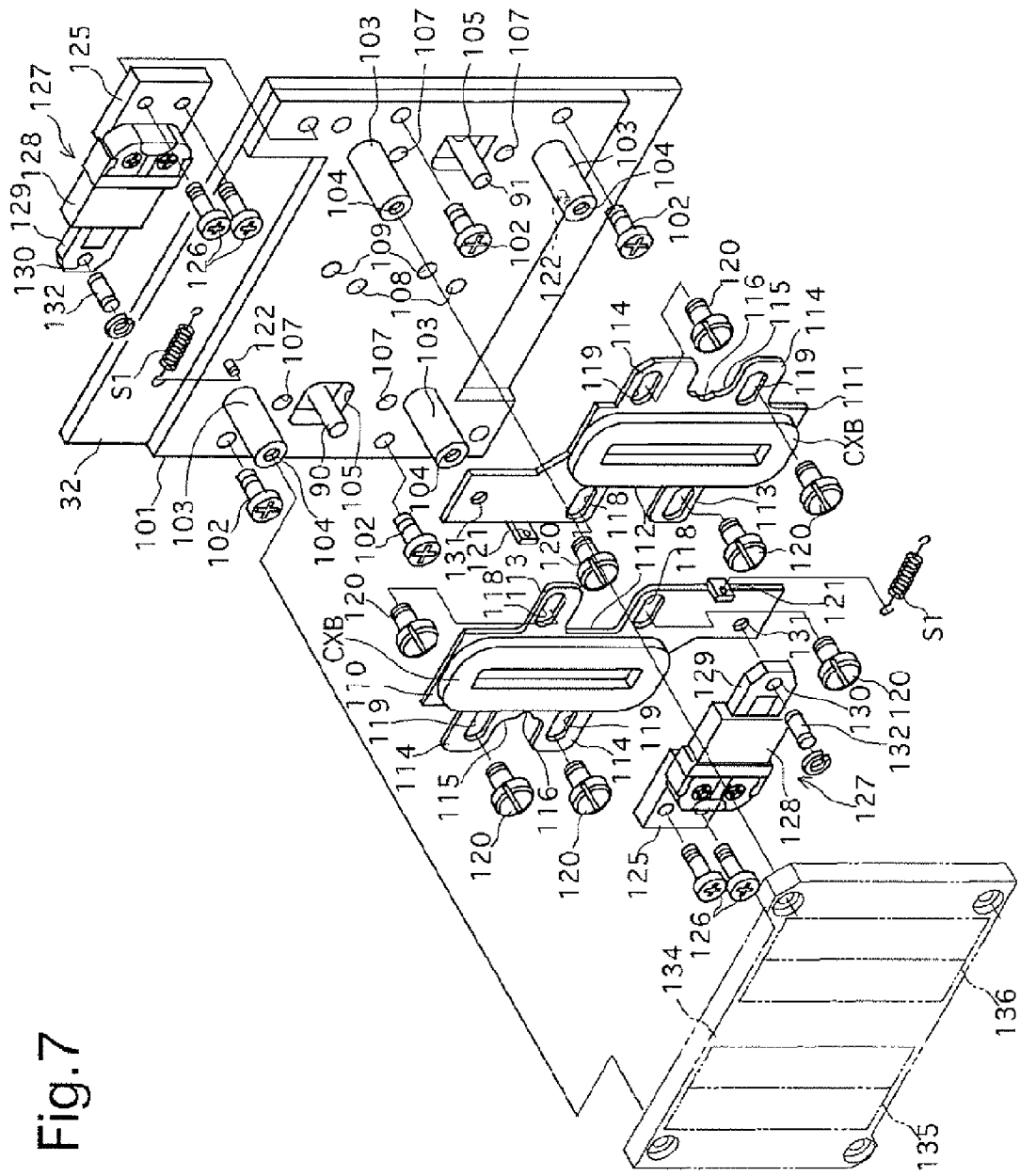
FIG. 7 is an exploded perspective view of a first embodiment of a lock mechanism, according to the present invention, which some members thereof omitted for clarity.
Figure 10:
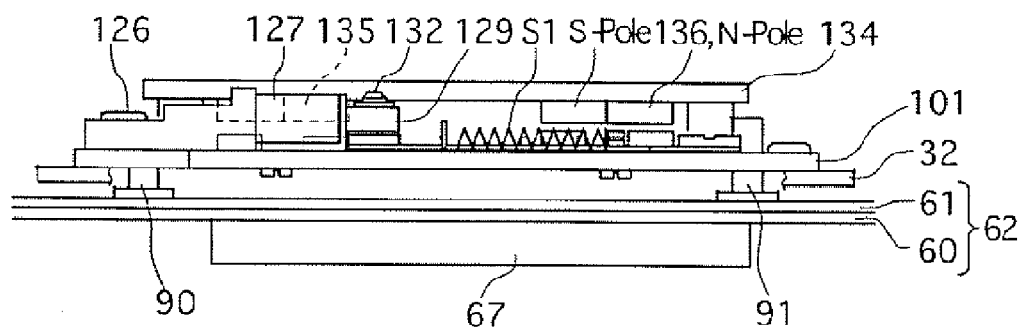
FIG. 10 is bottom view of the lock mechanism, as viewed in the direction of the arrow X shown in FIG. 9.
Figure 11:
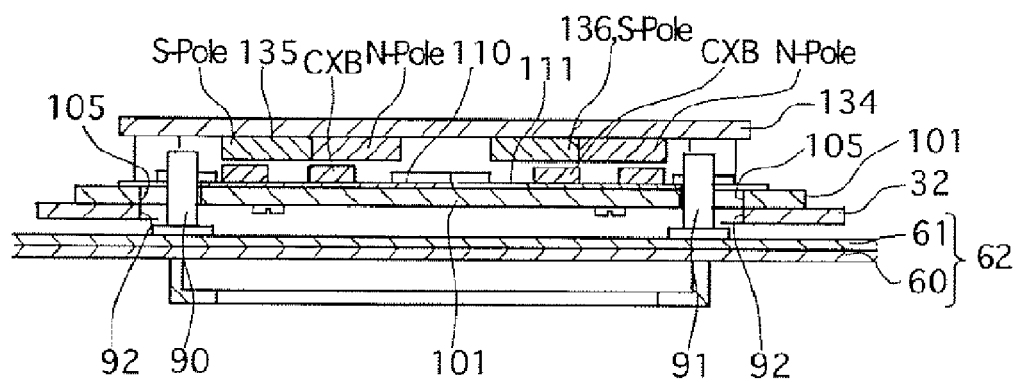
FIG. 11 is a cross sectional view of the lock mechanism take along the XI-XI line shown in FIG. 9.
Figure 12:
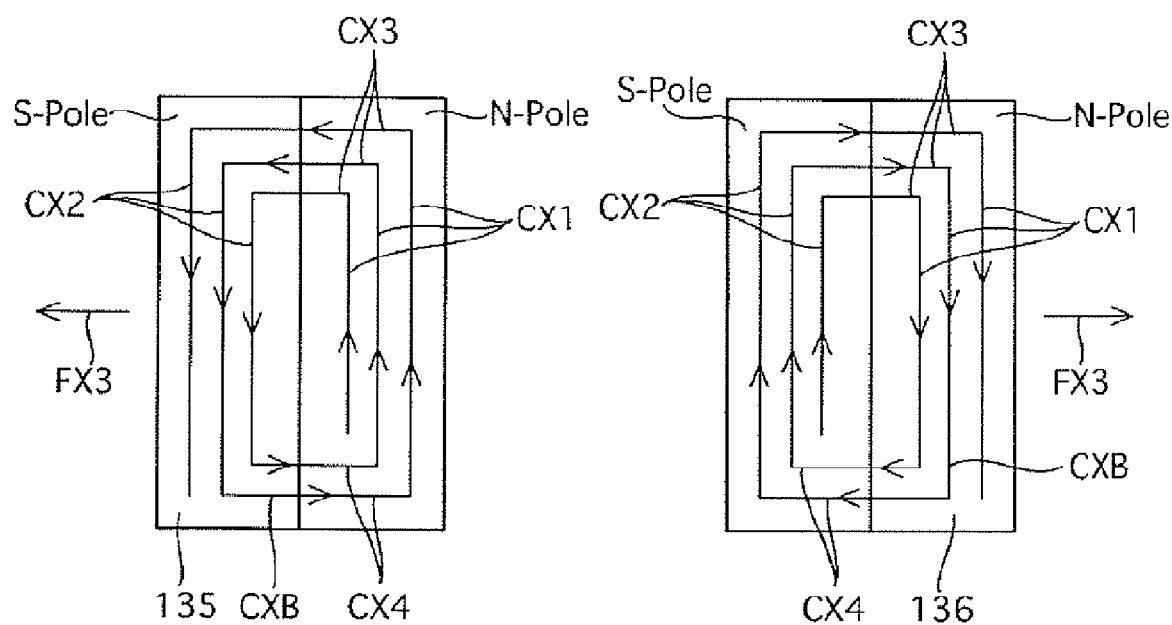
FIG. 12 is an enlarged schematic view of major elements of a drive device of the lock mechanism.

A front surface of a rear yoke 134, which extends parallel to the front yoke 101 and is made from a magnetic material such as soft iron, contacts the rear surfaces of the four cylindrical support members 103 at four positions thereon, and the rear yoke 134 is fixed to the four cylindrical support members 103 by four mounting screws 133 which are inserted through holes provided in the rear yoke 134 and are screw-engaged into the four female screw-holes 104 of the four cylindrical support members 103, respectively. As shown in FIG. 11, the front surface of the rear yoke 134 is positioned so as to be separated in the rearward direction from the lock member 110, the lock member 111 and the X-direction drive coils CXB. A permanent magnet 135 and a permanent magnet 136 which face each X-direction drive coil CXB of the left and right lock members 110 and 111, respectively, are fixed to the front surface of the rear yoke 134. As shown in FIGS. 7, 10 and 12, an N-pole and an S-pole of each of the permanent magnets 135 and 136 are aligned in the X-direction. An X-direction magnetic circuit is formed between the rear yoke 134, the permanent magnet 135 and the front yoke 101, and an X-direction magnetic circuit is formed between the rear yoke 134, the permanent magnet 136 and the front yoke 101 due to magnetic flux of the permanent magnets 135 and 136 passing through the front yoke 101 and the rear yoke 134. As shown in FIG. 11, the left and right X-direction drive coils CXB are positioned within the two X-direction magnetic circuits.

Furthermore, as shown in FIG. 12, linear right sides CX1 of the left X-direction drive coil CXB and the N-pole of the permanent magnet 135 overlap each other in the Z-direction (forward/rearward direction parallel to the optical axis O), and linear left sides CX2 of the left X-direction drive coil CXB and the S-pole of the permanent magnet 135 overlap each other in the Z-direction, and this overlapping relationship is always maintained regardless of the position of the left lock member 110. Similarly, linear right sides CX1 of the right X-direction drive coil CXB and the N-pole of the permanent magnet 136 overlap each other in the Z-direction (forward/rearward direction parallel to the optical axis O), and linear left sides CX2 of the left X-direction drive coil CXB and the S-pole of the permanent magnet 136 overlap each other in the Z-direction, and this overlapping relationship is always maintained regardless of the position of the right lock member 111.

The front yoke 101, the rear yoke 134, the permanent magnet 135, the permanent magnet 136 and the left and right X-direction drive coils CXB constitute a lock driving device. Furthermore, the front yoke 1011 the rear yoke 134, and the permanent magnets 135 and 136 constitute a magnetic-force generator.

The operation of the above-described lock mechanism 100 will be described hereinafter.

The left and right X-direction drive coils CXB and the aforementioned coils provided in the left and right plungers 127 are electronically controlled by the aforementioned controller provided inside the digital camera 20.

When a camera-shake correction switch SW, provided on the camera body (see FIG. 1), is OFF, the movable stage 62 is at the initial position (non-operational state) as shown in FIG. 2, and the controller does not supply any electric current to the X-direction drive coil CXB. Major portions of the left and right magnetic slide plates 129 are sunk inside the left and right plunger bodies 128 by the magnetic force of the permanent magnets provided inside the left and right plungers 127, respectively, and since the magnetic attractive force between the permanent magnets and the left and right magnetic slide plates 129 is stronger than the tension of the extension springs S1, the left and right lock members 110 and 111 are held (retained) at the engaged position shown in FIG. 9. Accordingly, the left and right lock-engaging grooves 116 of the left and right lock members 110 and 111 respectively engage with the engaging pins 90 and 91, and the movable stage 62 is held (locked) at the initial position shown in FIG. 2.

If the camera-shake correction switch SW is turned ON is this engaged position, electric current is instantaneously supplied from the controller to each coil of the left and right plungers 127. Thereupon, since the magnetic forces of the permanent magnets provided inside the left and right plungers 127 are cancelled out upon electric current being instantaneously supplied to each coil of the left and right plungers 127, it is possible for the major portions of the left and right magnetic slide plates 129 to move out of the plunger bodies 128, respectively. In this state, since the biasing forces (tension) of the left and right extension springs S1 are also exerted on the left and right lock members 110 and 111, the left and right lock members 110 and 111 respectively move toward the disengaged position, and the left and right magnetic slide plates 129 project largely out of the left and right plunger bodies 128, respectively (see FIG. 8 (the left and right inward projections 113 loosely fit into the right and left recesses 112 of the lock members 110 and 111, respectively)). Therefore, since the left and right lock-engaging grooves 116 move inwards, away from the engaging pins 90 and 91, respectively, the engaging pins 90 and 91 are unlocked.

Even upon the left and right lock-engaging grooves 116 reaching the disengaged position, since the biasing forces of the left and right extension springs S1 are exerted on the left and right lock members 110 and 111, the left and right lock members 110 and 111 are held (retained) at the disengaged position. Accordingly, the movable stage 62 together with the CCD 65 enter an operational state in which the above-described camera-shake correction operation can be carried out.

Upon the camera-shake correction operation being completed and the camera-shake correction switch SW being turned OFF, the controller supplies electric current to the two X-direction drive coils CX and the two Y-directions drive coils CYA and CYB, so that the movable stage 62 is returned to the initial position as shown in FIG. 2. Furthermore, electric current is supplied from the controller to the left and right X-direction drive coils CXB in the direction shown by the arrows in FIG. 12. Accordingly, since a linear drive force (which is stronger than the biasing forces of the extension springs S1) in a direction FX3 occurs in the left and right X-direction drive coils CXB, as shown in FIG. 12, the left and right lock members 110 and 111 move to the engaged position, shown in FIG. 9, in accordance with this linear drive force and the left and right lock-engaging grooves 116 re-engage with the engaging pins 90 and 91, respectively when the left and right lock members 110 and 111 reach the engaged position, a major portion of each magnetic slide plate 129 of the left and right plungers 127 sinks inside each corresponding plunger body 128, and each magnetic slide plate 129 and the corresponding permanent magnet (provided in the plunger body 128 thereof) are magnetically attracted so as to contact each other. Furthermore, the electric current supplied from the controller to the left and right X-direction drive coils CXB is stopped, so that the above-mentioned linear drive force disappears. Even after electric current is no longer supplied to the left and right X-direction drive coils CXB, since the left and right lock members 110 and 111 are still held (retained) at the engaged position due to the magnetic force of each permanent magnet provided in the left and right plungers 127, the movable stage 62 (CCD 65) are again at the initial position in a state where a camera-shake correction operation cannot be carried out.

According to the above description, the engaging pins 90 and 91 of the movable stage 62 which is at the initial position are locked so as to be supported (pushed against) in opposite outward directions by utilizing the left and right lock-engaging grooves 116 of the respective left and right lock members 110 and 111. Accordingly, compared to the prior art in which one boss (engaging pin) is clasped and locked by abutting members (lock members), a firmer and stronger locking state can be achieved with the lock mechanism 100 of the present invention using the same driving force.

Furthermore, since the movable stage 62 (CCD 65) is rotatable relative to the front stationary support board 31 and the rear stationary support board 32, if only one lock pin (engaging pin) were to be provided as in the prior art, even if the lock pin were to be locked by lock members, rotation of the movable stage 62 (CCD 65) could not be prevented. However, if a construction is provided like that of the present invention in which a pair of engaging pins (the engaging pins 90 and 91) are locked by a pair of lock members (the left and right lock members 110 and 111), rotation of the movable stage 62 (CCD 65) can be prevented, and hence, the lock mechanism 100 demonstrates a special benefit when applied a camera-shake correction apparatus (camera-shake correction apparatus 30) in which rotational camera-shake can be corrected.

In addition, since the left and right lock-engaging grooves 116 are positioned in between (the inner sides) the engaging pins 90 and 91, it is possible to reduce the horizontal width (in the left/right direction) of the lock mechanism 100 compared to the case where the engaging pins 90 and 91 is engaged with the lock-engaging grooves 116 from the outer sides of the engaging pins 90 and 91.

Furthermore, when the lock mechanism 100 is locked and unlocked, since the left and right lock members 110 and 111 are immovably held (retained) by the magnetic force of the permanent magnet provided in the left and right plungers 127 and the biasing force of the extension springs S1, electrical power consumption can be reduced compared to the case of using a retaining device which is electrically powered.

Furthermore, no force is exerted on the engaging pins 90 and 91 by the left and right lock members 110 and 111 in the direction of the optical axis O during a locking operation. Accordingly, the CCD 65 is not moved in the optical axis O direction during a locking operation, and hence, no adverse effect on the focus state of the CCD 65 occurs.

Since the lock mechanism 100 is simple in structure, a reduction in manufacturing costs is possible, and the lock mechanism 100 has superior durability.

Furthermore, since the left and right lock-engaging grooves 116 each have an approximately half-circular shape, when the engaging pins 90 and 91 engage with the left and right lock-engaging grooves 116, the engaging pins 90 and 91 automatically move into the inner portions of the left and right lock-engaging grooves 116. Accordingly, the engaging pins 90 and 91 can be securely and smoothly engaged into the left and right lock-engaging grooves 116, respectively.

Furthermore, since the engaging pins 90 and 91 are aligned on the X-direction line LX which passes through the center of gravity of an integral movable body which includes the movable stage 62 and other members integral therewith (the CCD 65, the CCD holder 67, etc.), the force gravity applied on the engaging pins 90 and 91 does not significantly change regardless of the attitude of the digital camera 20 (regardless of the direction of the optical axis O), and hence, the engaging pins 90 and 91 can be securely lock-engaged with the left and right lock-engaging grooves 116, respectively, at all times.

A second embodiment of a lock mechanism 200 of the present invention will be described hereinafter with reference to FIGS. 13 through 19. Note that the construction of the digital camera 20 and the construction of the camera-shake correction apparatus 30 of the second embodiment are the same as those of the first embodiment Furthermore, since the structure of the lock mechanism 200 of the second embodiment is similar to the lock mechanism 100 of the first embodiment, like members are designated with like numerals and detailed descriptions of such members are omitted.

A front yoke 201 of the lock mechanism 200 is a flat rectangular plate made from a magnetic material such as soft iron similar to the front yoke 101 of the first embodiment. A bottom left corner portion of the front yoke 200 is provided with a downward-extending projection 202. The front yoke 201 is fixed to the rear surface of the rear stationary support board 32 by four mounting screws 203 inserted through four corner portions of the front yoke 201.

Figure 13:
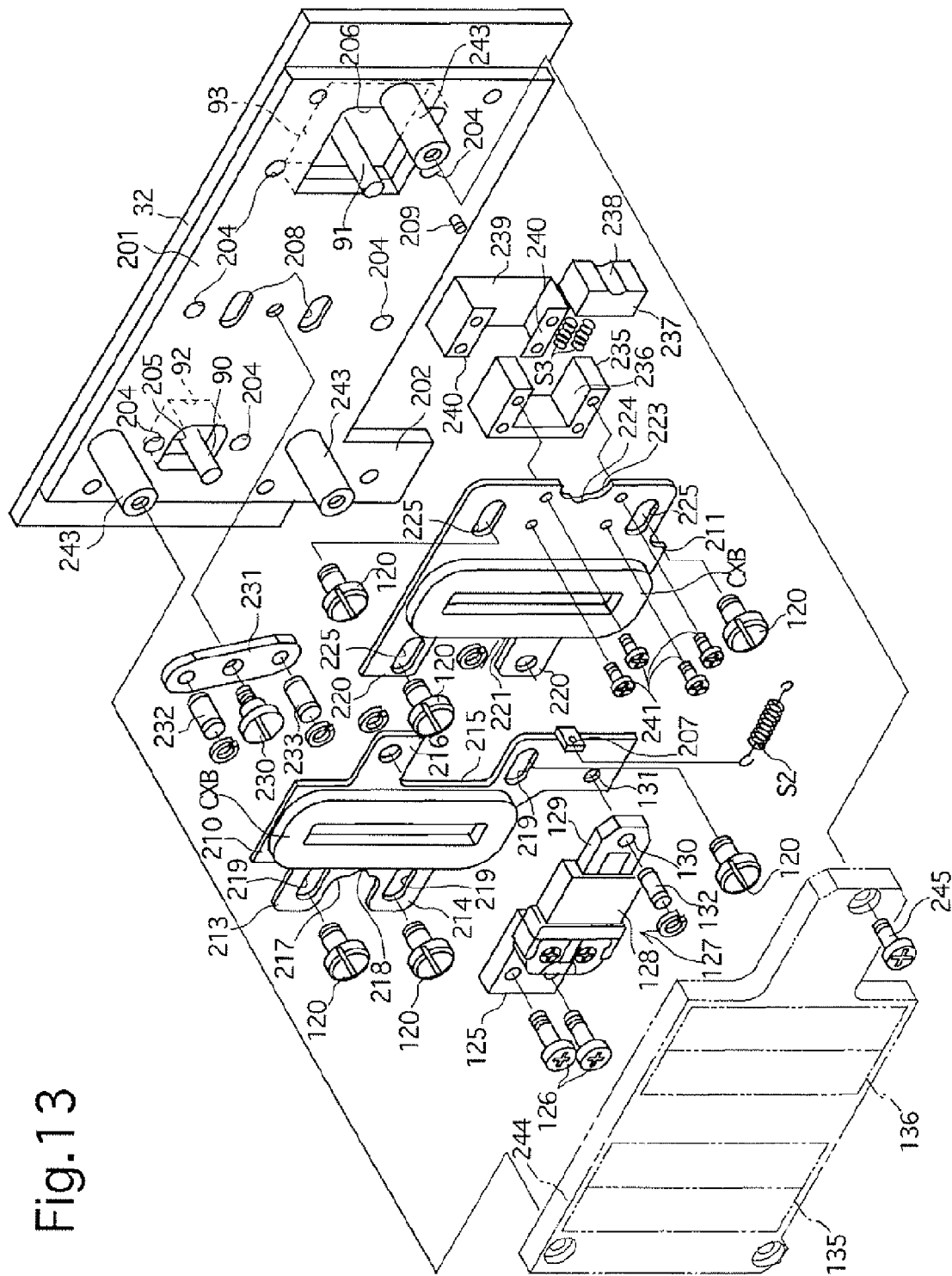
FIG. 13 is an exploded perspective view of a second embodiment of a lock mechanism, according to the present invention, which some members thereof omitted for clarity.

The front yoke 201 is provided with a left square hole 205 having substantially the same size and shape of the left and right square holes 105 of the first embodiment, and a right square hole 206 which is larger than the square hole 205. As shown in FIG. 13, an insertion hole (square through-hole) 93 having the same size and shape as the square hole 206 is provided in a right side portion of the rear stationary support board 32. The engaging pin 90 extends through the insertion hole 92 of the rear stationary support board 32 and the square hole 205 of the front yoke 201, and the engaging pin 91 extends through the insertion hole 93 of the rear stationary support board 32 and the square hole 206 of the front yoke 201. Furthermore, the front yoke 201 is provided at a central portion thereof with a pair of upper and lower guide slots 208 which extend in the X-direction.

A pair of left and right lock members 210 and 211, which are provided directly behind the front yoke 201, are flat plate members which are both provided parallel to the rear stationary support board 32. The left and right lock members 210 and 211 are relatively movable in the X-direction with respect to the front yoke 201 and are provided in between the engaging pins 90 and 91. The left lock member 210 is provided on the left edge thereof with a pair of upper and lower projections 213 and 214. A recess 215 is formed on the right edge of the left lock member 210, and a projection 216 is provided on the right edge of the left lock member 210 directly above the recess 215. An engaging recess 217 is provided between the upper and lower projections 213 and 214. The inner edge of the engaging recess 217 is provided with an approximately half-circular shaped lock-engaging groove (engaging portion) 218. Three guide slots 219, which extend in the X-direction and have the same shape and size as the guide slots 119 of the first embodiment, are provided at three positions on the lock member 210 including the upper and lower projections 213 and 214, and an X-direction drive coil CXB is fixed to the rear surface of the lock member 210.

The right lock member 211 is provided on the left edge thereof with a pair of upper and lower projections 220, and a recess 221 is provided in between the upper and lower projections 220. An engaging recess 223 is formed on the right edge of the lock member 211, and the inner edge of the engaging recess 223 is provided with an approximately half-circular shaped lock-engaging groove (engaging portion) 224. Furthermore, three guide slots 225, which extend in the X-direction and have the same shape and size as the guide slots 219, are provided at three positions on the lock member 211 including the upper projection 220, and an X-direction drive coil CXB is fixed to the rear surface of the lock member 211.

Mounting screws 120 are inserted through the guide slots 219 and the guide slots 225, and the (six) mounting screws 120 are screw-engaged with six screw holes 204, respectively, which are formed in the rear surface of the front yoke 201. The left and right lock members 210 and 211 are both slidable in the X-direction with respect to the front 201 in accordance with the engaging relationship between the guide slots 219 and 225 and the mounting screws 120, so as to linearly move between the disengaged position shown in FIG. 14 and the engaged position shown in FIG. 15. Since the left and right lock members 210 and 211 are sandwiched in a forward/rearward direction between the heads of the mounting screws 120 and the front yoke 201, the front surfaces of the left and right lock members 210 and 211 are always in contact with the rear surface of the front yoke 201. Furthermore, the ends of an extension spring (second retaining device/biasing device/unlock driving device) S2 are engaged (connected) with an engaging hole 207 provided on a rearward-extending projection formed on a right lower edge of the lock member 210 and a spring-hook projection 209 which projects rearwardly from the rear surface of the front yoke 201. The extension spring S2 always biases the lock member 210 so as to move toward the disengaged position.

A link member (an element of an interconnecting device) 231, which is rotatably mounted on the front yoke 201 via a rotational mounting pin (an element of the interconnecting device/rotational shaft or rotational axis) 230 extending through a central portion of the link member 231 in the forward/rearward direction (i.e., normal to the front yoke 201), is provided directly behind both the projection 216 of the lock member 210 and the lower projection 220 of the lock member 211. An upper end portion of the link member 231 is rotatably mounted to the projection 216 of the lock member 210 via a mounting shaft (mounting axis/element of the interconnecting device) 232 which extends parallel with the rotational mounting pin 230 (i.e., normal to the front yoke 201) and via a round hole formed in the projection 216. A lower end portion of the link member 231 is rotatably mounted to the lower projection 220 of the lock member 211 via a mounting shaft (mounting axis/element of the interconnecting device) 233 which extends parallel with the rotational mounting pin 230 (i.e., normal to the front yoke 201) and via around hole formed in the lower projection 220. The front end portions of the mounting shafts 232 and 233 are slidably fitted into the upper and lower guide slots 208, respectively.

Figure 14:
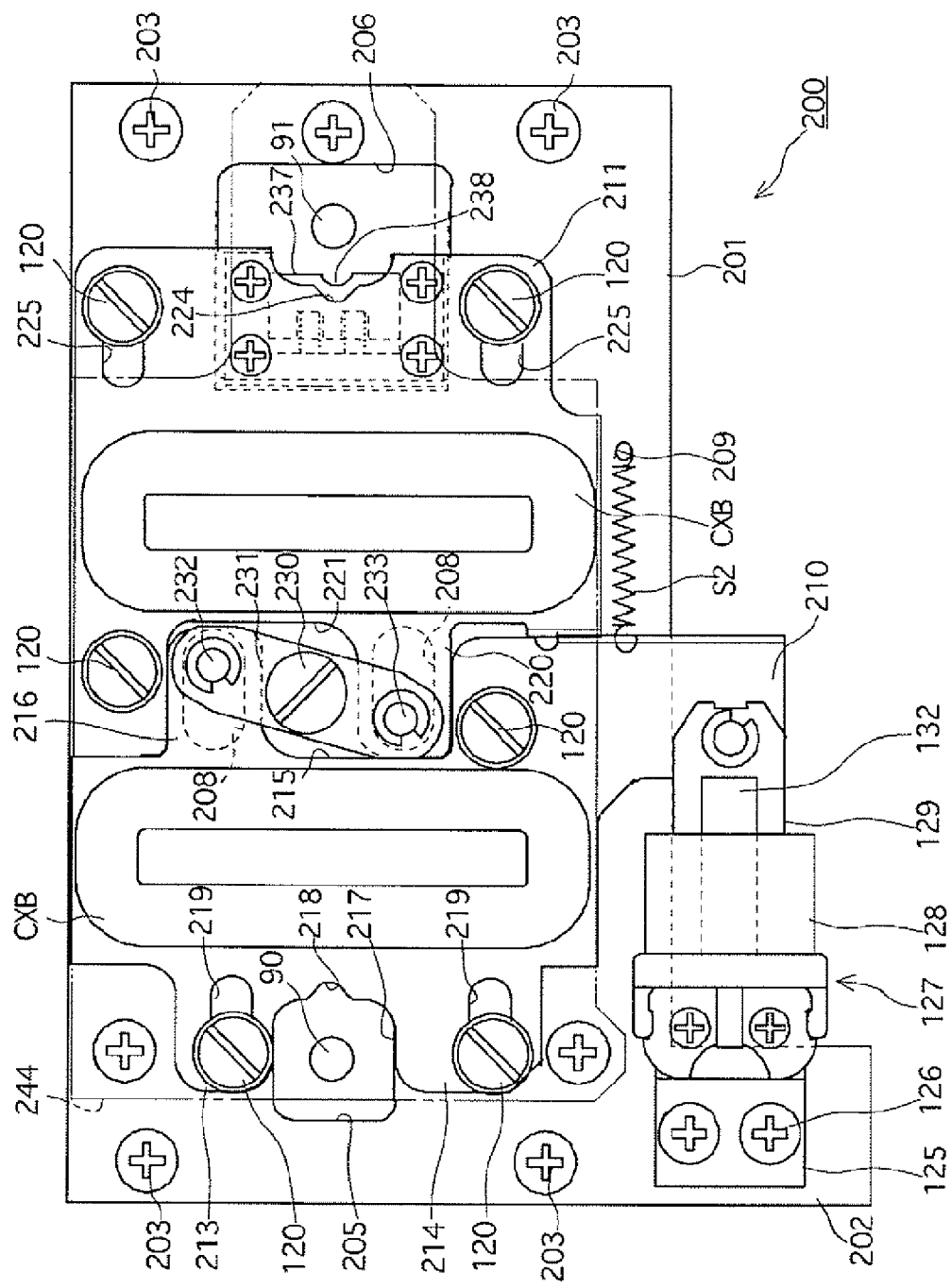
FIG. 14 is a rear view of the lock mechanism in a disengaged state, with a rear yoke omitted for clarity.
Figure 15:
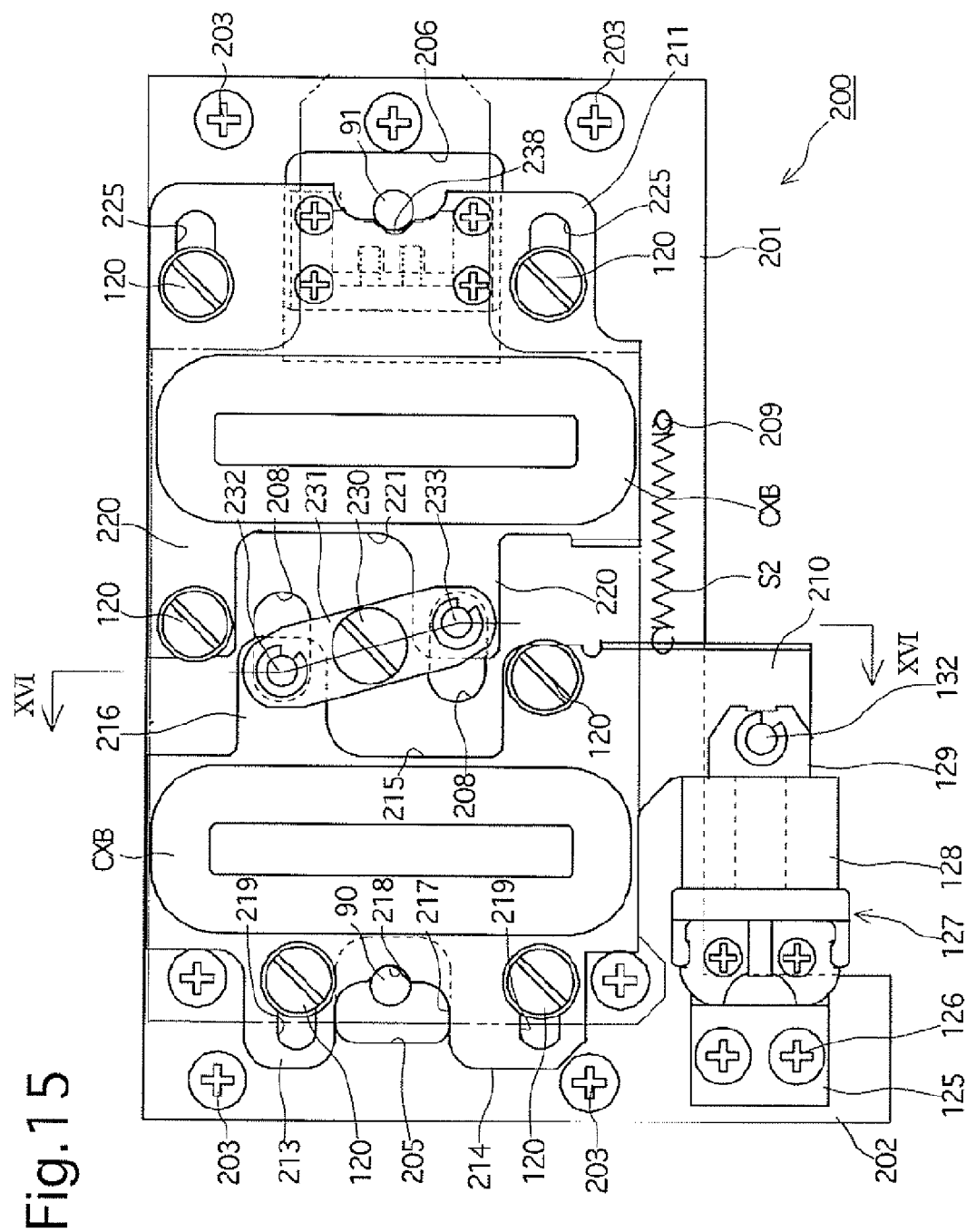
FIG. 15 is a rear view of the lock mechanism in an engaged state, with the rear yoke omitted for clarity.
Figure 16:
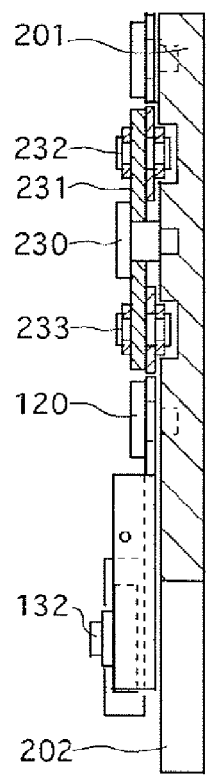
FIG. 16 is a cross sectional view of the lock mechanism taken along the XVI-XVI line shown in FIG. 15.

Hence, since the left and right lock members 210 and 211 are interlinked (interconnected) by the link member 231, the movement of the left and right lock members 210 and 211 is also interconnected. In other words, as shown in FIG. 14, when one of the left and right lock members 210 and 211 moves to the disengaged position, the other of the left and right lock members 210 and 211 also moves to the disengaged position. Similarly, as shown in FIG. 15, when one of the left and right lock members 210 and 211 moves to the engaged position, the other of the left and right lock members 210 and 211 also moves to the engaged position.

Figure 17:
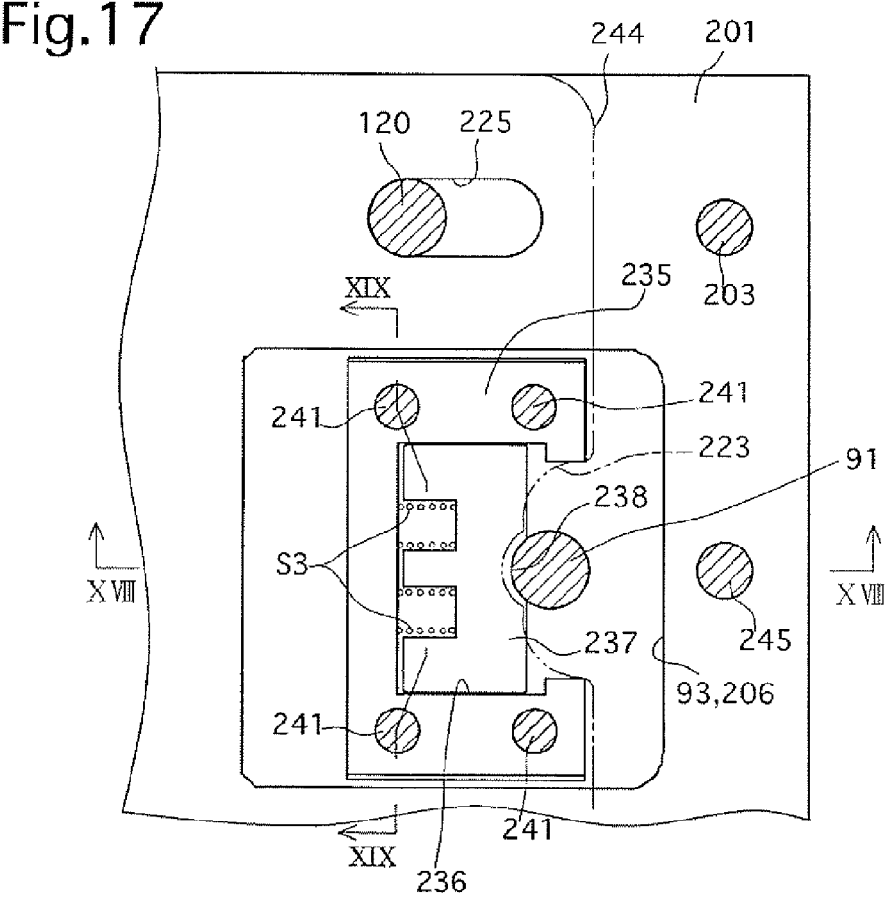
FIG. 17 is an enlarged view of the lock members and the surrounding area thereof.
Figure 18:
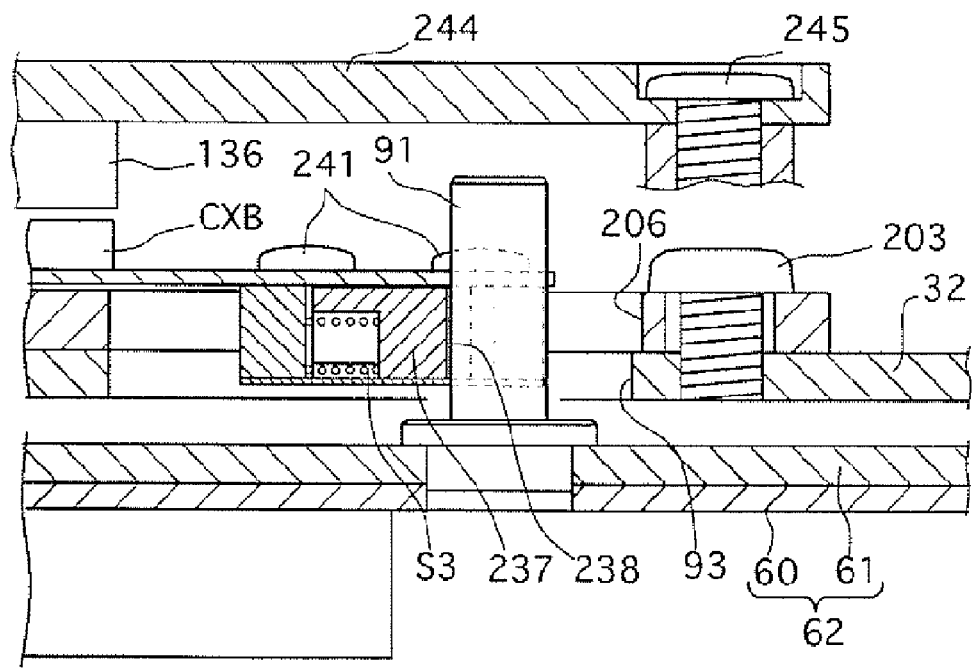
FIG. 18 is a cross sectional view of the lock members taken along the XVIII-XVIII line shown in FIG. 17.
Figure 19:
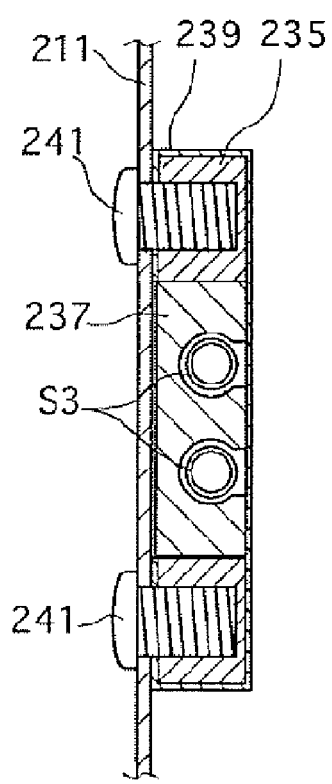
FIG. 19 is a cross sectional view of the lock members taken along the XIX-XIX line shown in FIG. 17.
Figure 20:
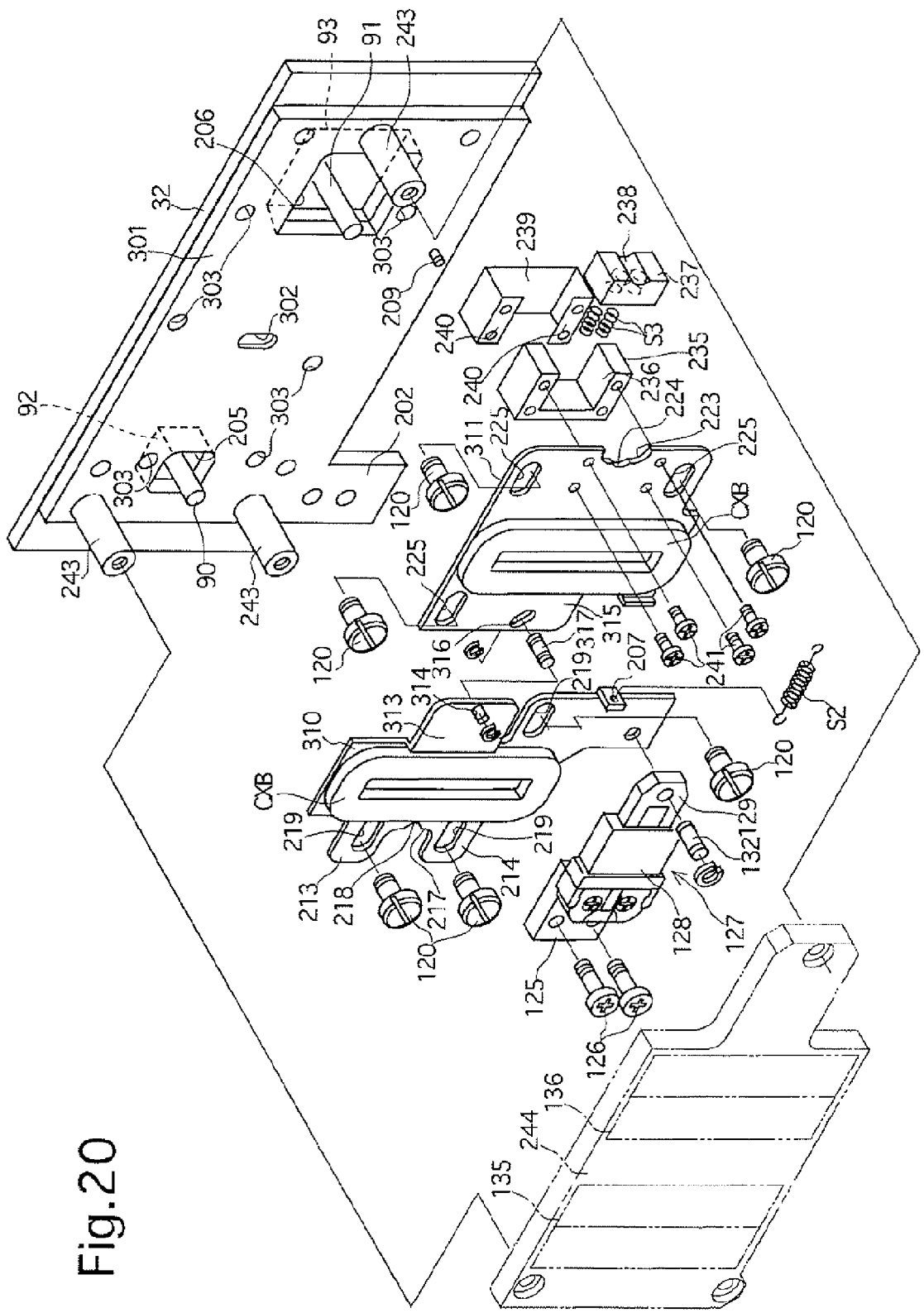
FIG. 20 is an exploded perspective view of a third embodiment of a lock mechanism, according to the present invention, which some members thereof omitted for clarity.

A C-shaped support member 235 is mounted on the front surface of the lock member 211 in the vicinity of the engaging recess 223. An accommodation recess 236 is formed in the support member 235, and the accommodation recess 236 accommodates a lock-engaging member (movable engaging portion) 237 therein. As shown in FIG. 17, since the accommodation recess 236 and the lock-engaging member 237 have substantially the same length (height) in the Y-direction, and the accommodation recess 236 has a larger length (width) in the X-direction, the lock-engaging member 237 is slidable within the accommodation recess 236 in the X-direction. A right side surface of the lock-engaging member 237 is provided with a lock-engaging groove 238 which has a substantially halt-circle cross-sectional profile and can be disengageably engaged with the engaging pin 91. Furthermore, two compression springs (resilient members) S3 are provided in between the left inner surface of the accommodation recess 236 and the lock-engaging member 237 so that the lock-engaging member 237 is always biased in the right direction by the compression springs S3.

The support member 235 is surrounded by a cover member 239 which is formed a resilient material. The cover member 239 is provided with upper and lower rearwardly-bent pieces 240 which are resiliently engaged with upper and lower portions of the rear surface of the support member 235. The support member 235 and the cover member 239 are mounted onto the front surface of the lock member 211 by four mounting screws 241 being inserted through four holes provided on the right side of the lock member 211, i.e., through two holes provided in the upper rearwardly-bent piece 240 and two holes provided in the lower rearwardly-bent piece 240, and screw-engaged into corresponding four holes (two upper holes and two lower holes) provided in the rear side of the support member 235.

The support member 235, the lock-engaging member 237, the cover member and the compression springs S3 constitute a (resiliently deformable) resilient engaging portion.

Since the support member 235, the lock-engaging member 237 and the cover member 239 are all smaller in size than the square hole 206 and the insertion hole 93 (see FIGS. 17 and 18), when the lock member 211 is slidably moved in the X-direction, the support member 235, the lock-engaging member 237 and the cover member 239 are all moved relative to the square hole 206 and the insertion hole 93 in the X-direction. When the left and right lock members 210 and 211 are moved to the disengaged position, the lock-engaging groove 218 moves inwards (rightwards) away from the engaging pin 90, and the lock-engaging groove 224 and the lock-engaging member 237 (lock-engaging groove 238) move inwards (leftwards) away from the engaging pin 91 (see FIG. 14). Conversely, when the left and right lock members 210 and 211 are moved to the engaged position, the lock-engaging grooves 218 and 238 engage with the engaging pins 90 and 91, respectively (see FIG. 15).

Note that when the movable stage 62 is in the initial position shown in FIG. 2 and the right lock member 211 is at the disengaged position shown in FIG. 14, the distance between the facing surfaces of the lock-engaging member 237 (lock-engaging groove 238) and the engaging pin 91 is shorter than the distance between the engaged position and the disengaged position of the right lock member 211.

One attachment plate 125 is mounted onto the rear surface of the downward-extending projection 202 of the front yoke 201 by the mounting screws 126, and a magnetic slide plate 129 of a plunger 127 is interlinked with a lower end portion of the lock member 210 via the linkage pin 132.

As shown in FIG. 13, the rear surface of the front yoke 201 is provided at three positions thereon with three rearward projecting cylindrical support members 243. A front surface of a rear yoke 244, which is a flat plate made from a magnetic material such as soft iron, abuts against each rear surface of each cylindrical support member 243. Furthermore, three mounting screws 245 are inserted through the rear yoke 244 at three positions which correspond to the three cylindrical support members 243 and are screw-engaged with female screw-holes provided in the three cylindrical support members 243, respectively, so that the rear yoke 244 is mounted to the three cylindrical support members 243. A permanent magnet 135 and a permanent magnet 136 which face each x-direction drive coil CXB of the left and right lock members 210 and 211, respectively, are fixed to the front surface of the rear yoke 244. The positional relationship between the permanent magnets 135 and 136, and the two X-direction drive coils CXB, is the same as the first embodiment, as shown in FIG. 12.

The front yoke 201, the rear yoke 244, the permanent magnet 135, the permanent magnet 136 and the left and right X-direction drive coils CXB constitute a lock driving device. Furthermore, the front yoke 201, the rear yoke 244, and the permanent magnets 135 and 136 constitute a magnetic-force generator. Moreover, the left and right X-direction drive coils CXB are electronically controlled by the controller provided inside the digital camera 20.

The timing of supplying electric current to the left and right X-direction drive coils CXB and the aforementioned coils provided in the left and right plungers 127, of the lock mechanism 200, is the same as that of the first embodiment. Furthermore, the lock-engaging groove 218 of the left lock member 210 and the lock-engaging groove 238 of the lock-engaging member 237 lock-engage with the engaging pins 90 and 91, respectively, with the same timing as that of the first embodiment. Furthermore, the lock-engaging groove 218 of the left lock member 210 and the lock-engaging groove 238 of the lock-engaging member 237 disengage with the engaging pins 90 and 91, respectively, with the same timing as that of the first embodiment.

According to the above description of the second embodiment, the engaging pins 90 and 91 of the movable stage 62, which is positioned at the initial position, can be securely locked by using the lock-engaging groove 218 of the left lock member 210 and the lock-engaging groove 238 of the lock-engaging member 237.

Furthermore, since the left and right lock members 210 and 211, and the lock-engaging member 237 are all provided in between (inner sides of) the engaging pins 90 and 91, it is possible to reduce the horizontal width (in the left/right direction) of the lock mechanism 200 compared to the case where the engaging pins 90 and 91 were to be engaged with the lock-engaging grooves 218 and 238 from the outer sides of the engaging pins 90 and 91.

Since the movement of the left and right lock members 210 and 211 are interlinked by a link mechanism (link member 231), only one extension spring S2 and one plunger 127 are necessary, so that the number of members of the lock mechanism 200 can be reduced.

Furthermore, since the lock-engaging member 237 is slidable in the X-direction and is resiliently supported by the compression springs S3, even if the assembled positions of the engaging pins 90 and 91 or the support member 235 and lock-engaging member 237 are a little out of alignment compared to the positions designated at the design stage, when the lock member 211 is moved to the engaged position, the lock-engaging groove 238 of the lock-engaging member 237 can be securely engaged with the engaging pin 91.

Furthermore, by changing the biasing force of the compression springs S3, when the lock member 211 is moved to the engaged position, the lock-engaging groove 238 can be made to engage with the engaging pin 91 with a stronger force, and it is also possible to not only make the lock-engaging groove 238 engage with the engaging pin 91 but also the lock-engaging groove 224.

A third embodiment of a lock mechanism 300 of the present invention will be described hereinafter with reference to FIGS. 20 through 23. Note that the construction of the digital camera 20 and the construction of the camera-shake correction apparatus 30 of the third embodiment are the same as those in the first embodiment. Furthermore, since the structure of the lock mechanism 300 of the third embodiment is similar to the lock mechanisms 100 and 200 of the first and second embodiments, like members are designated with like numerals and detailed descriptions of such members are omitted.

The main difference between the lock mechanism 300 of the third embodiment and the lock mechanism 200 of the second embodiment is that in the lock mechanism 300, a cam mechanism is used to interconnect the movement of left and right lock members 310 and 311 instead of using a link mechanism (rotational mounting pin 230, link member 231, and mounting shafts 232 and 233).

A front yoke 301 of the lock mechanism 300 is made from a magnetic material such as soft iron and has a general shape which is substantially the same as that of the front yoke 201 of the second embodiment. However, instead of the pair of upper and lower guide slots 208 of the second embodiment, the front yoke 301 is provided with a guide slot 302 which is elongated in the Y-direction along a substantially central portion of the front yoke 301.

Left and right lock members 310 and 311, which correspond to the left and right lock members 210 and 211 of the second embodiment, have slightly different shapes to those of the left and right lock members 210 and 211. Similar to the lock member 210, the lock member 310 is provided with an engaging hole 207, a pair of upper and lower projections 213 and 214, an engaging recess 217, a lock-engaging groove 218, and three guide slots 219, and an X-direction drive coil CXB is fixed to the rear surface of the lock member 310. In addition, a bent projection plate 313 is formed (via a bending operation using, e.g., a bending press) on a right portion of the lock member 310 so as to be stepped in a rearward direction compared to the remainder of the lock member 310. A cam slot (an element of an interconnecting device) 314 is formed in the bent projection plate 313 and extends in a direction 45 degrees to the Y-direction.

The lock member 311 is provided with three guide slots 225, like those of the lock member 211 of the second embodiment, and an X-direction drive coil CXB is fixed to the rear surface of the lock member 311. In addition, a cam slot (an element of the interconnecting device) 316, which is bilaterally symmetrical to the cam slot 314, is formed in a left projection 315 provided on the left side of the lock member 311.

Similar to the second embodiment, the left and right lock members 310 and 311 are positioned in between the engaging pins 90 and 91, mounting screws 120 are inserted through the guide slots 219 of the lock member 310 and the guide slots 225 of the lock member 311, and the (six) mounting screws 120 are each screw-engaged with six screw holes 303 formed in the front yoke 301, respectively, so that the left and right lock members 310 and 311 are slidably movable in the X-direction.

Figure 21:
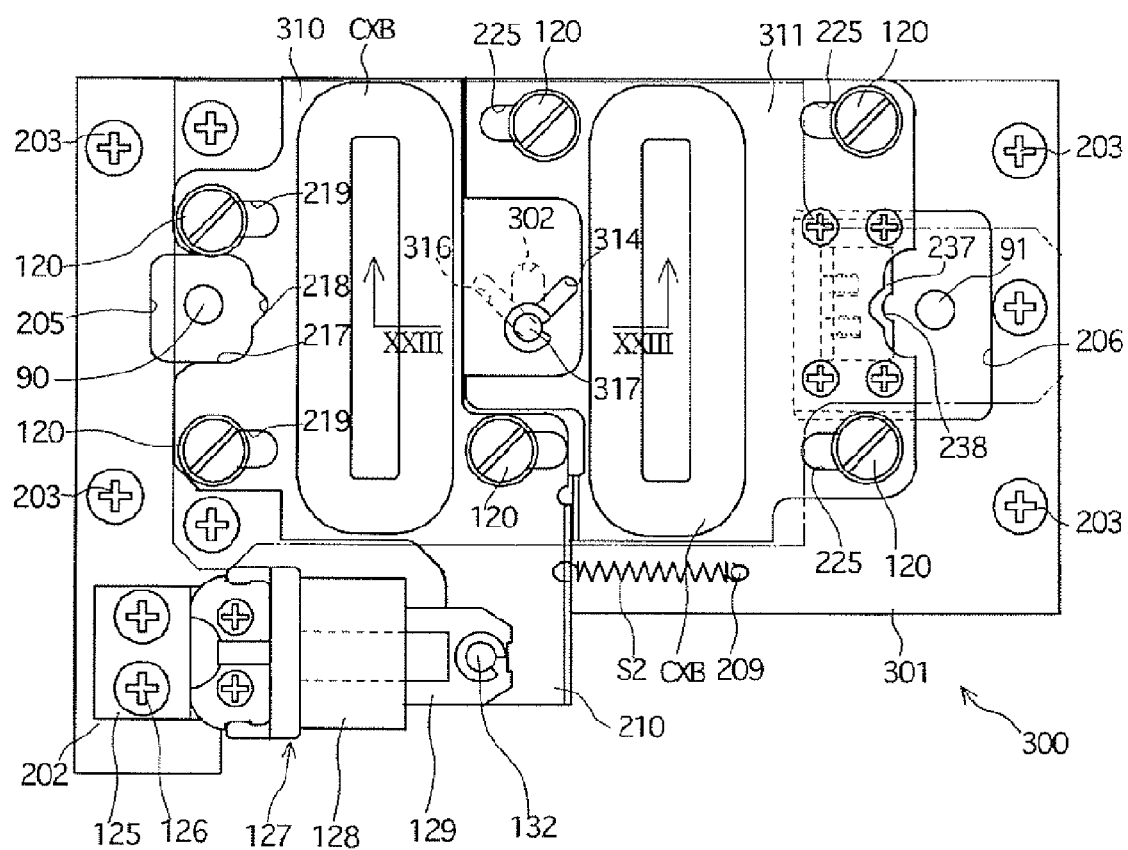
FIG. 21 is a rear view of the lock mechanism in a disengaged state, with a rear yoke omitted for clarity.
Figure 22:
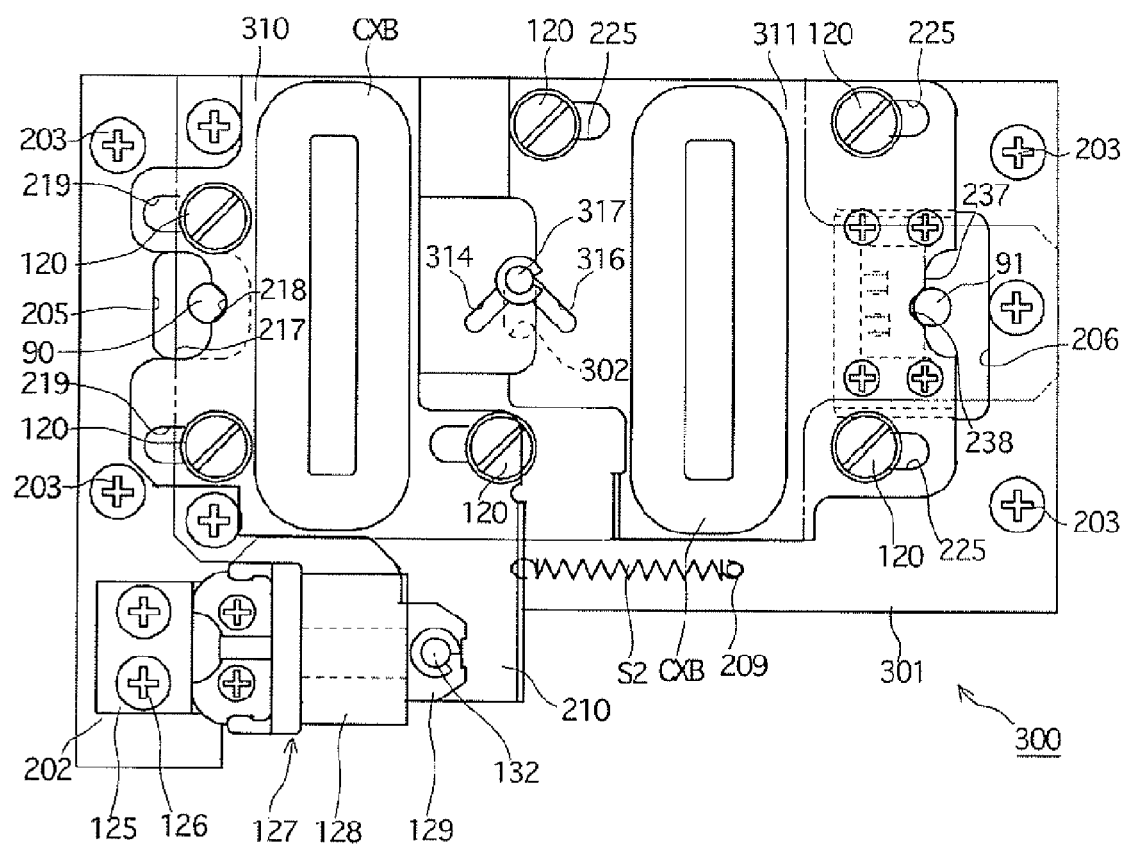
FIG. 22 is a rear view of the lock mechanism in an engaged state, with the rear yoke omitted for clarity.
Figure 23:
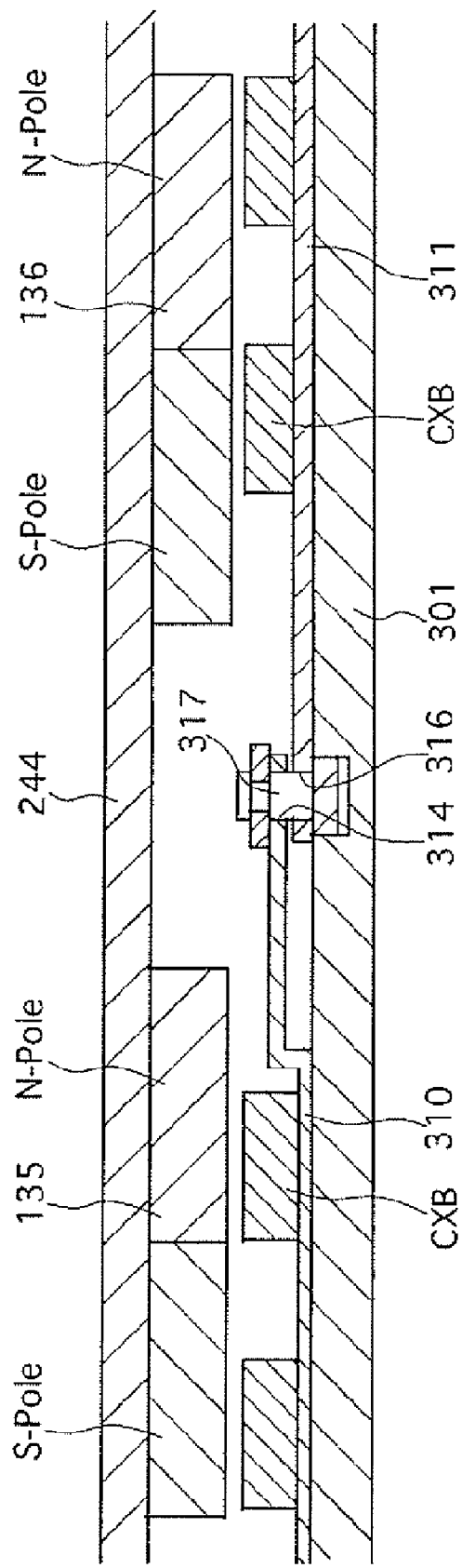
FIG. 23 is a cross sectional view of the lock mechanism taken along the XXIII-XXIII line shown in FIG. 21.
Figure 24:
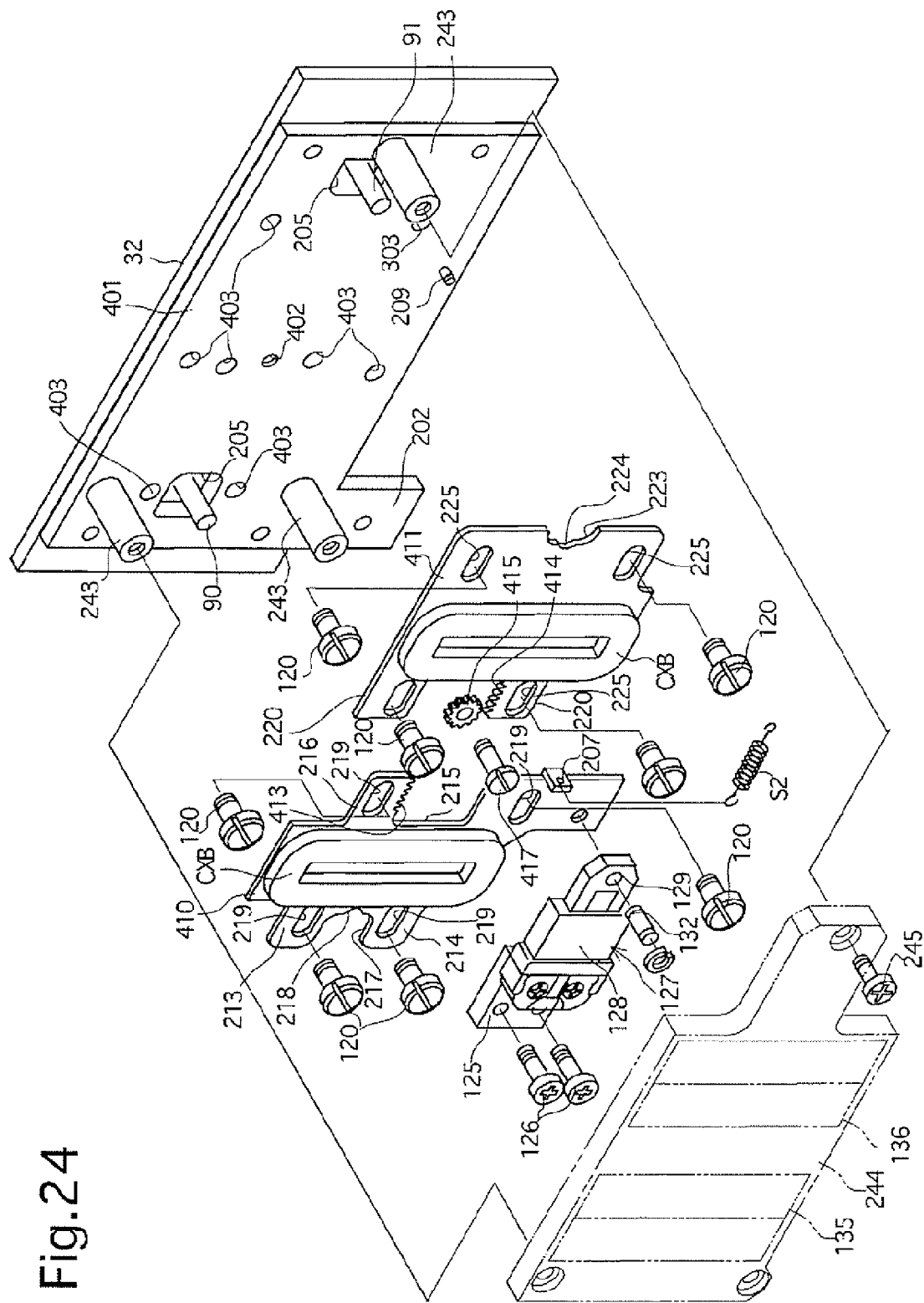
FIG. 24 is an exploded perspective view of a fourth embodiment of a lock mechanism, according to the present invention, which some members thereof omitted for clarity.

The left projection 315 of the Lock member 311 is positioned between the bent projection plate 313 of the lock member 310 and the front yoke 301 with respect to the forward/rearward direction. A cylindrical cam pin (an element of the interconnecting device) 317, which extends in the forward/rearward direction, is inserted through the cam slots 314 and 316, and the front end of the cam pin 317 is slidably fitted into the guide slot 302. The cam pin 317 slides within the cam slots 314 and 316 so that the movement of the left and right lock members 310 and 311 is interconnected via the cam pin 317. In other words, as shown in FIG. 22, the left and right lock members 310 and 311 are positioned at the engaged position when the cam pin 317 is positioned at the upper ends of the guide slot 302, and the cam slots 314 and 316; and as shown in FIG. 21, the left and right lock member 310 and 311 are positioned at the disengaged position when the cam pin 317 is positioned at the lower ends of the guide slot 302, and the cam slots 314 and 316.

The support member 235 and the cover member 239 are mounted to the front surface of the right side portion of the lock member 311 with mounting screws 241. The magnetic slide plate 129 of the plunger 127 is interconnected with a lower end portion of the lock member 310 via a linkage pin 132. Furthermore, the ends of an extension spring S2 are engaged (connected) with an engaging hole 207 provided on a rearward-extending projection formed on a right lower edge of the lock member 310 and a spring-hook projection 209 which projects rearwardly from the rear surface of the front yoke 301.

The positional relationship between the permanent magnets 135 and 136, and the two X-direction drive coils CXB is the same as the first and second embodiments, as shown in FIG. 12.

The front yoke 301, the rear yoke 244, the permanent magnet 135, the permanent magnet 136 and the left and right X-direction drive coils CXB constitute a lock driving device. Furthermore, the front yoke 301, the rear yoke 244, and the permanent magnets 135 and 136 constitute a magnetic-force generator. Moreover, the left and right X-direction drive coils CXB are electrically connected to the controller provided inside the digital camera 20.

The timing of supplying electric current to the left and right X-direction drive coils CXB and the aforementioned coil provided in the plunger 127, of the lock mechanism 300, is the same as that of the second embodiment. Furthermore, the lock-engaging groove 218 of the left lock member 310 and the lock-engaging groove 238 of the lock-engaging member 237 (and the lock-engaging groove 224 of the right lock member 311) lock-engage and disengage with the engaging pins 90 and 91, respectively, with the same timing as that of the second embodiment.

Accordingly, the same effect which is achieved in the second embodiment can be achieved in the third embodiment.

A fourth embodiment of a lock mechanism 400 of the present invention will be described hereinafter with reference to FIGS. 24 through 28. Note that the construction of the digital camera 20 and the construction of the camera-shake correction apparatus 30 of the fourth embodiment are the same as those in the first embodiment. Furthermore, since the structure of the lock mechanism 400 of the fourth embodiment is similar to the lock mechanisms 100, 200 and 300 of the first through third embodiments, like members are designated with like numerals and detailed descriptions of such members are omitted.

The main difference between the lock mechanism 400 of the fourth embodiment and the lock mechanism 200 of the second embodiment is that in the lock mechanism 400, a rack and pinion mechanism is used instead of using a link mechanism (rotational mounting pin 230, link member 231, and mounting shafts 232 and 233) in order to interconnect the movement of left and right lock members 410 and 411, and furthermore, the lock mechanism 400 does not have the support member 235, the lock-engaging member 237 nor the cover member 239.

A front yoke 401 of the lock mechanism 400 is made from a magnetic material such as soft iron and has a general shape which is substantially the same as that of the front yoke 201 of the second embodiment. However, aright square hole 205 is provided on a right side portion of the front yoke 401 and has the same size and shape as the left square hole 205. Note that, although not shown in FIGS. 24 through 28, an insertion hole (square through-hole) 92 having the same size and shape as the right square hole 205 is provided at a corresponding right side portion of the rear stationary support board 32. The engaging pin 91 extends through the right insertion hole 92 and the right square hole 205.

Left and right lock members 410 and 411, which correspond to the left and right lock members 210 and 211 of the second embodiment, have a similar structure to the left and right lock members 210 and 211, but differ in that the bottom surface of the projection 216 is provided with a rack (an element of the interconnecting device) 413 and the upper surface of the lower projection 220 is provided with a rack (an element of the interconnecting device) 414. A pinion gear (an element of the interconnecting device) 415 is inter meshed with the racks 413 and 414, and a mounting screw 417 is inserted through a central hole of the pinion gear 415 in the forward/rearward direction and is screw-engaged with a screw hole 402 formed in a center portion of the front yoke 401. In other words, the pinion gear 415 is rotatable about the mounting screw 417.

Similar to the second embodiment, mounting screws 120 are inserted through the guide slots 219 of the lock member 410 and the guide slots 225 of the lock member 411, and the (six) mounting screws 120 are each screw-engaged with six screw holes 403 formed in the front yoke 401, respectively, so that the left and right lock members 410 and 411 are slidably movable in the X-direction.

The left and right lock members 410 and 411 are interconnected with each other via the rack and pinion mechanism constructed from the racks 413 and 414, and the pinion gear 415, so that the movement of the left and right lock members 410 and 411 are interconnected. Namely, as shown in FIG. 25, when the left lock member 410 is positioned at the engaged position, the right lock member 411 is also positioned at the engaged position, and as shown in FIG. 26, when the right lock member 411 is positioned at the disengaged position, the right lock member 411 is also positioned at the disengaged position.

Figure 25:
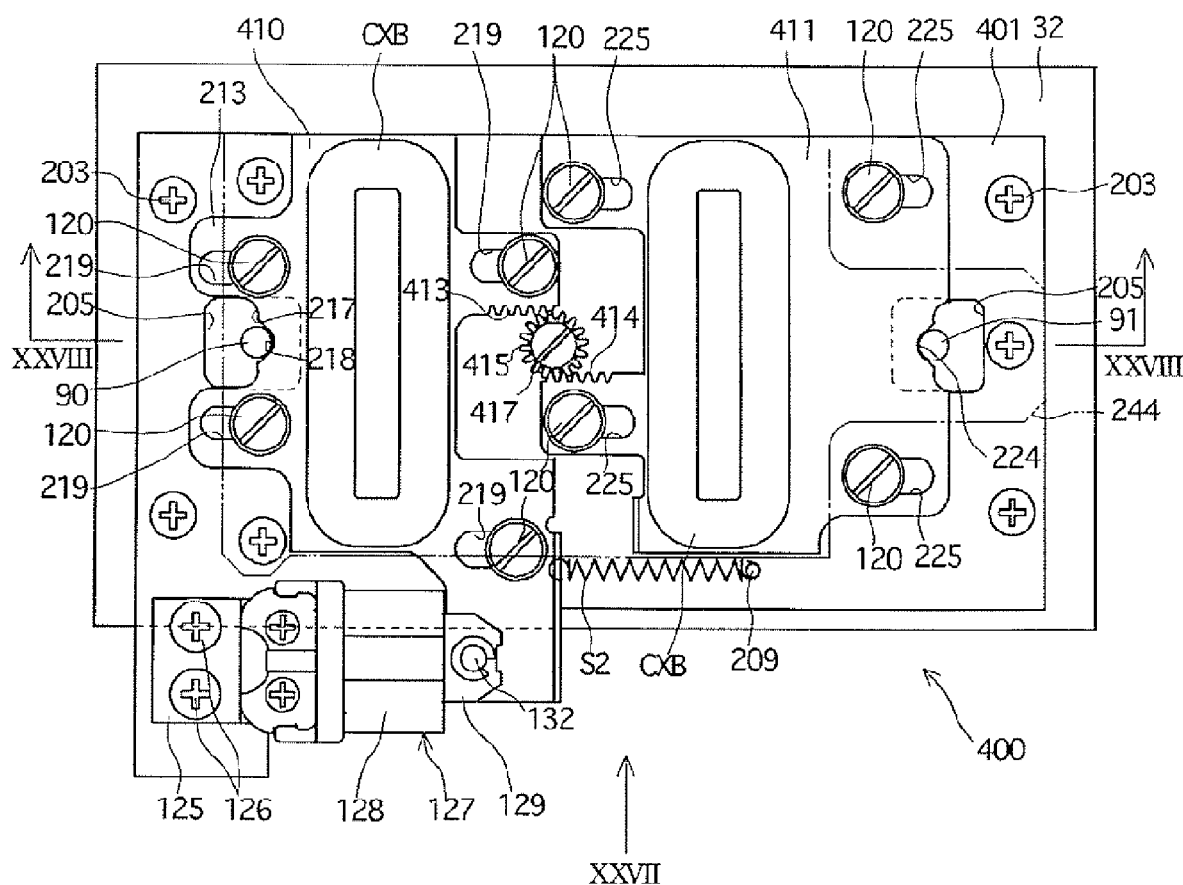
FIG. 25 is a rear view of the lock mechanism in an engaged state, with a rear yoke omitted for clarity.
Figure 26:
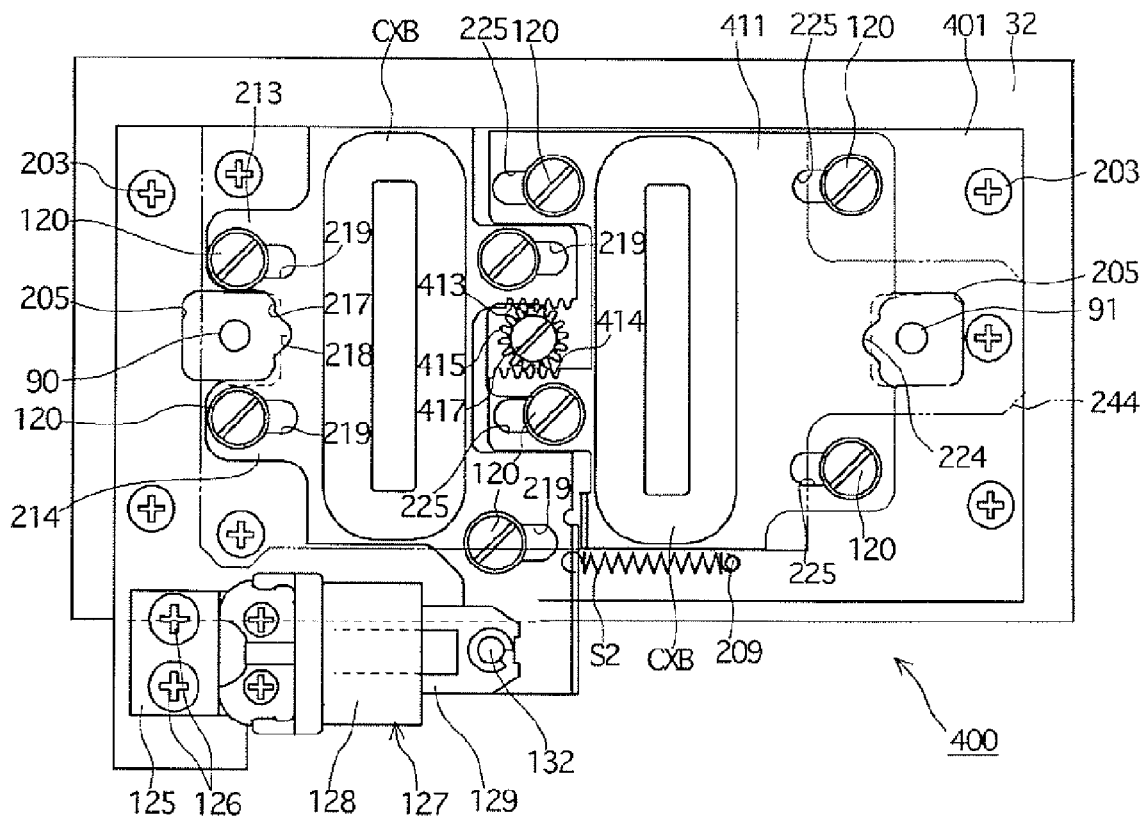
FIG. 26 is a rear view of the lock mechanism in a disengaged state, with the rear yoke omitted for clarity.
Figure 27:
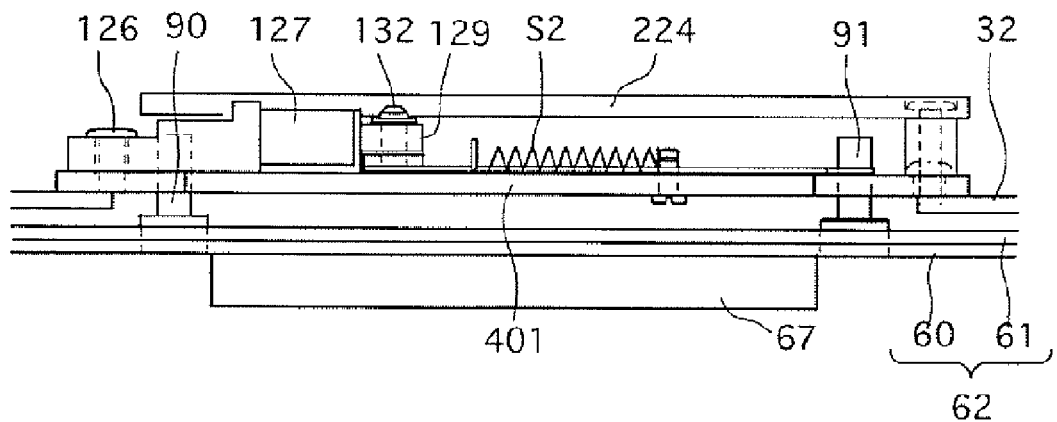
FIG. 27 is bottom view of the lock mechanism, as viewed in the direction of the arrow XXVII shown in FIG. 25.
Figure 28:
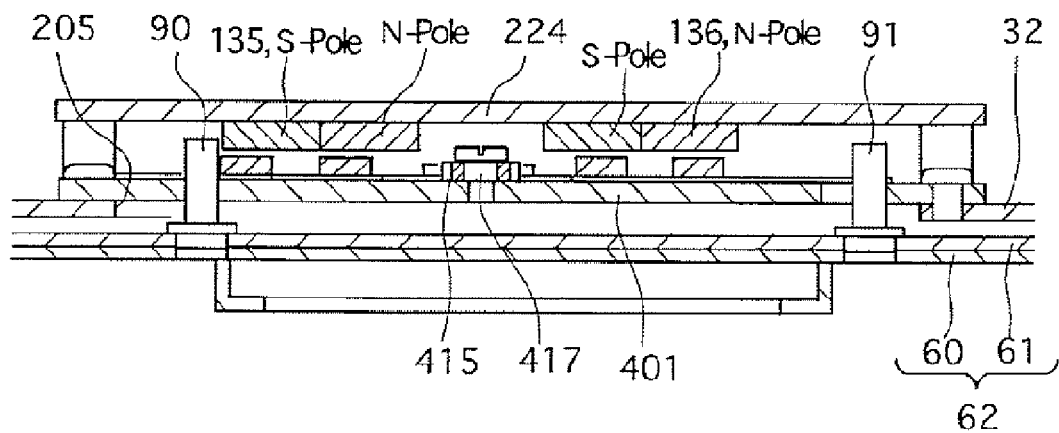
FIG. 28 is a cross sectional view of the lock mechanism taken along the XXVIII-XXVIII line shown in FIG. 25.

When the camera-shake correction apparatus 30 is at the initial state thereof (as shown in FIG. 2), upon the left and right lock members 410 and 411 moving to the engaged position, since a lock-engaging groove 218 of the lock member 410 and a lock-engaging groove 224 of the lock member 411 are engaged with the engaging pins 90 and 91, the engaging pins 90 and 91 are locked (see FIG. 25). Conversely, upon the left and right lock members 410 and 411 moving to the disengaged position, since the lock-engaging groove 218 moves inwards (rightwards) away from the engaging pin 90 while the lock-engaging groove 224 moves inwards (leftwards) away from the engaging pin 91, the engaging pins 90 and 91 are unlocked (see FIG. 26).

The ends of an extension spring S2 are engaged (connected) with an engaging hole 207 provided on a rearward-extending projection formed on a right lower edge of the lock member 410 and a spring-hook projection 209 which projects rearwardly from the rear surface of the front yoke 401. The magnetic slide plate 129 of the plunger 127 is interconnected with a lower end portion of the lock member 410 via a linkage pin 132.

The position relationship between the permanent magnets 135 and 136, and the two X-direction drive coils CXB, is the same as the first through third embodiments, as shown in FIG. 12.

The front yoke 401, the rear yoke 244, the permanent magnet 135, the permanent magnet 136 and the left and right X-direction drive coils CXB constitute a lock driving device. Furthermore, the front yoke 401, the rear yoke 244, and the permanent magnets 135 and 136 constitute a magnetic-force generator. Moreover, the left and right X-direction drive coils CXB are electrically connected to the controller provided inside the digital camera 20.

The timing of supplying electric current to the left and right X-direction drive coils CXB and the aforementioned coil provided in the plunger 127, of the lock mechanism 400, is the same as that of the second embodiment. Furthermore, the lock-engaging groove 218 of the left lock member 410 and the lock-engaging groove 224 of the right lock member 411 lock-engage and disengage with the engaging pins 90 and 911 respectively, with the same timing as that of the second embodiment.

Accordingly, the same effect which is achieved in the second embodiment can be achieved in the fourth embodiment.

Figure 29:
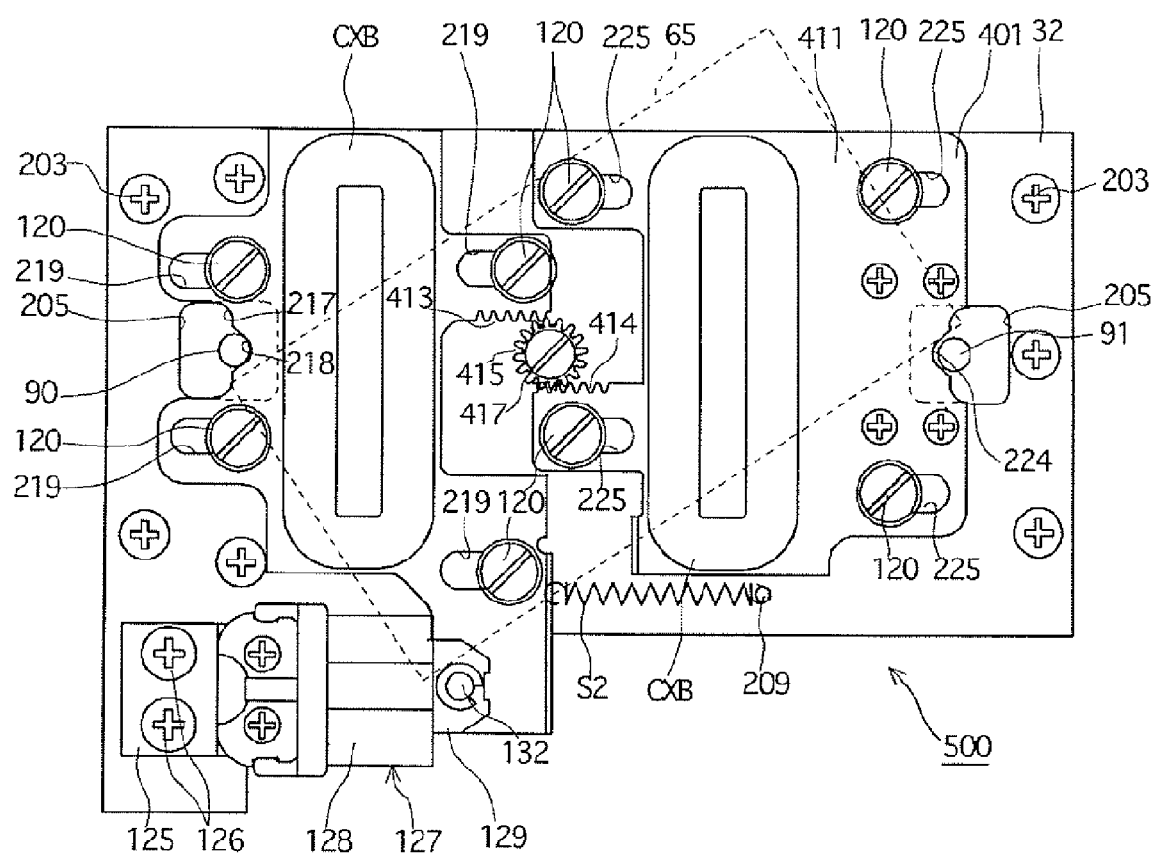
FIG. 29 is a rear view of the lock mechanism in an engaged state according to a fifth embodiment of the present invention, with the rear yoke omitted for clarity.

A fifth embodiment of a lock mechanism 500 of the present invention will be described hereinafter with reference to FIG. 29. Note that the construction of the digital camera 20 and the construction of the camera-shake correction apparatus 30 of the fifth embodiment are the same as those in the first embodiment. Furthermore, since the structure of the lock mechanism 500 of the fifth embodiment is the same as the lock mechanism 400 of the fourth embodiment, like members are designated with like numerals and detailed descriptions of such members are omitted.

Although the construction of the lock mechanism 500 is the same as that of the lock mechanism 400 of the fourth embodiment, the orientation of the lock mechanism 500 differs from that of the lock mechanism 400. Namely, as shown in FIG. 29, since the direction of an imaginary line which passes through the engaging pins 90 and 91 is substantially the same direction as a diagonal line of the CCD 65, not only can the same effect achieved in the fourth embodiment can be achieved in the fifth embodiment, it is also possible to increase the distance between the engaging pins 90 and 91 compared to that of the first through fourth embodiments. Accordingly, it is possible to lock the movable stage 62, at the initial position, more securely. Furthermore, it is possible to provided the lock mechanism 500 in a camera (digital camera 20) having a small width (in the X-direction).

Figure 30:
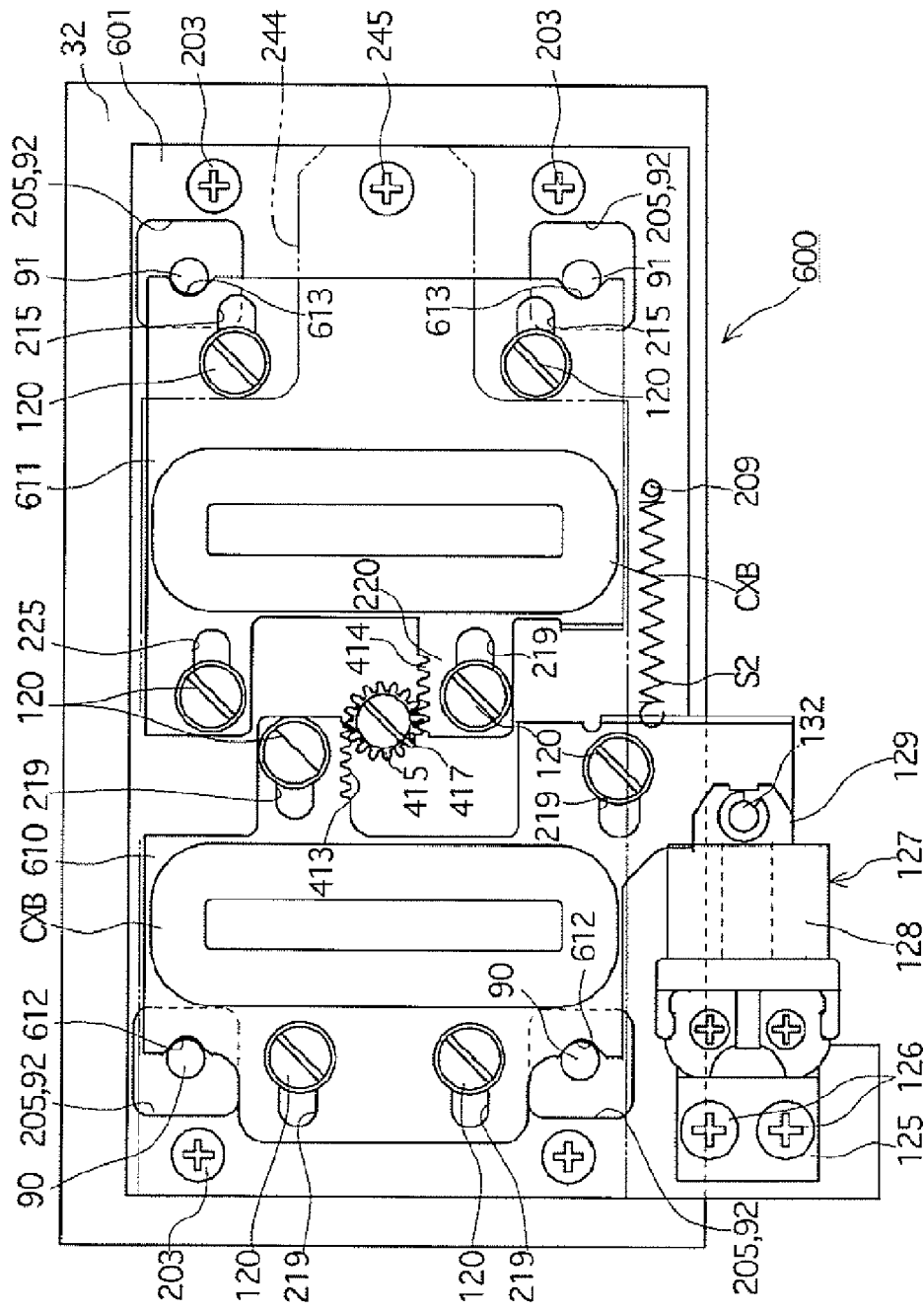
FIG. 30 is a rear view of the lock mechanism in an engaged state according to a sixth embodiment of the present invention, with the rear yoke omitted for clarity.
Figure 31:
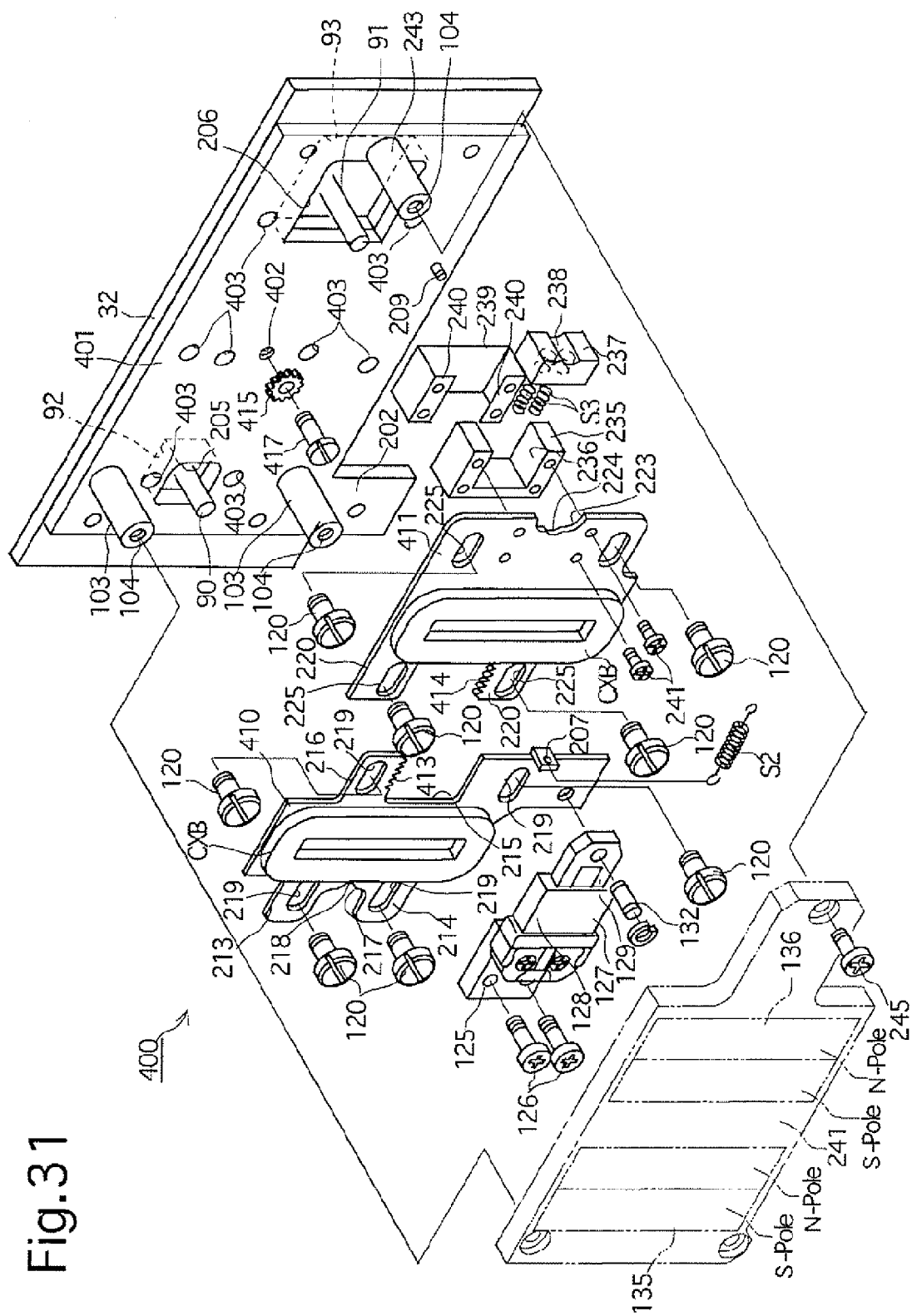
FIG. 31 is an exploded perspective view of a seventh embodiment of a lock mechanism, according to the present invention, which some members thereof omitted for clarity.
Figure 32:
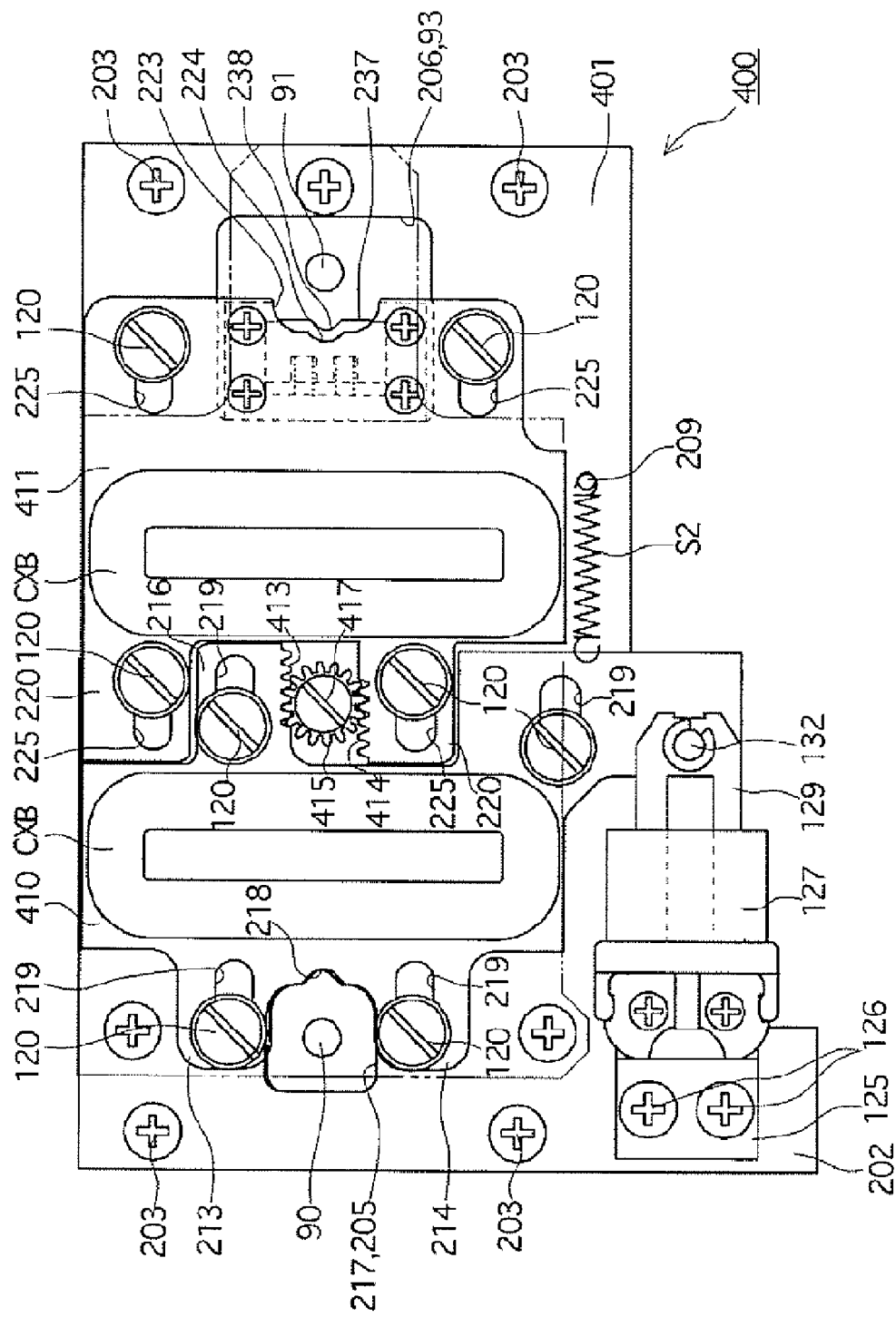
FIG. 32 is a rear view of the lock mechanism shown in FIG. 31 in a disengaged state, with a rear yoke omitted for clarity.
Figure 33:
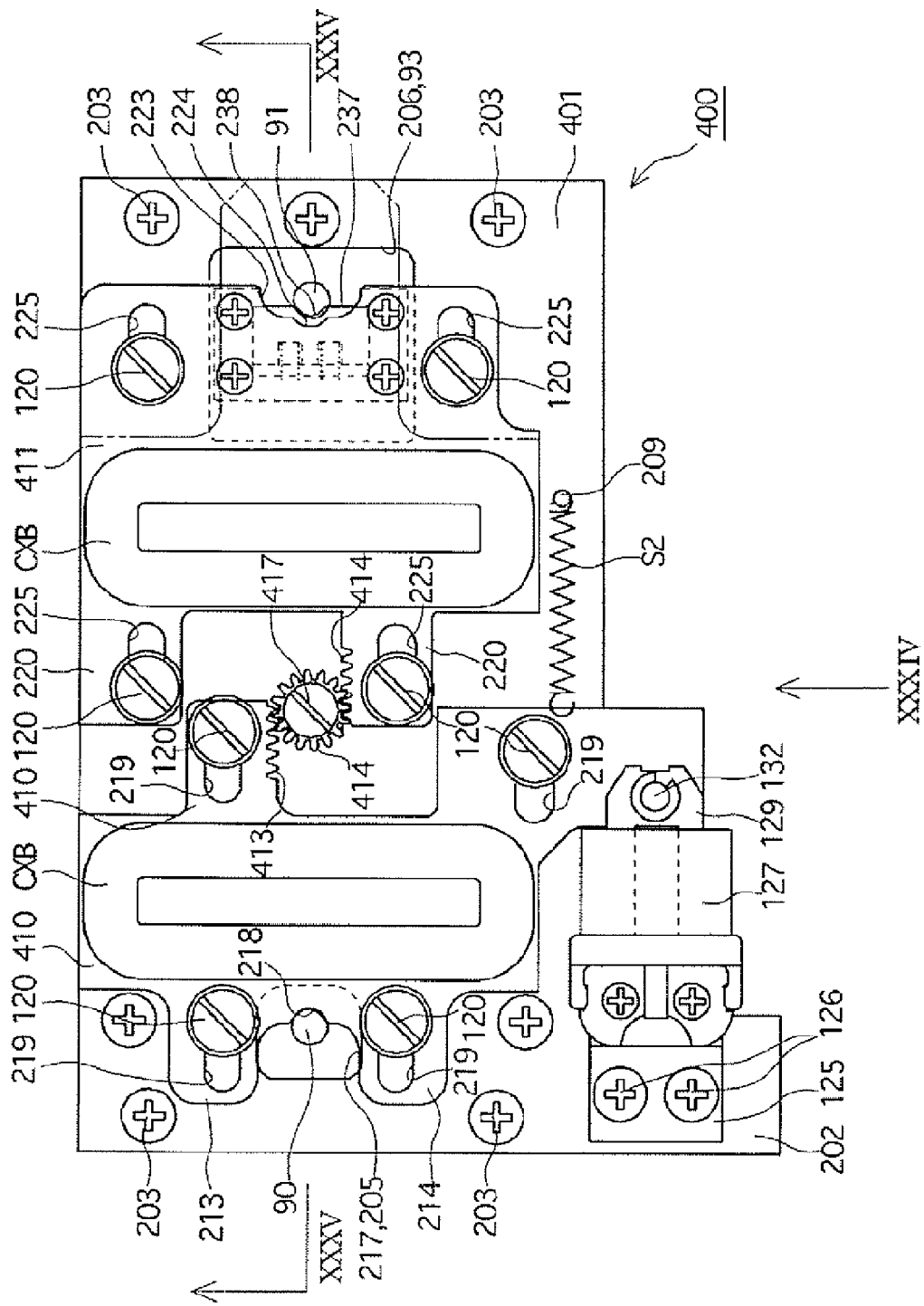
FIG. 33 is a rear view of the lock mechanism shown in FIG. 31 in an engaged state, with a rear yoke omitted for clarity.
Figure 34:
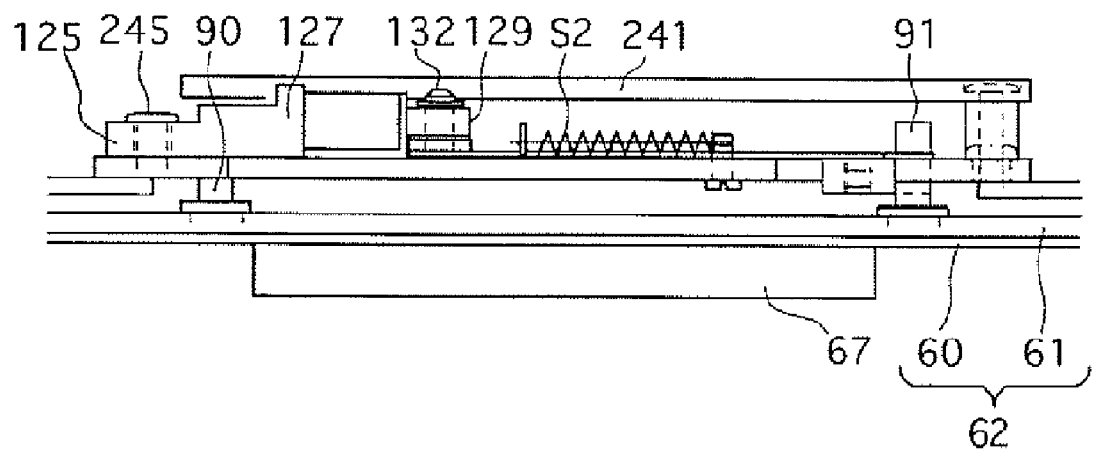
FIG. 34 is bottom view of the lock mechanism, as viewed in the direction of the arrow XXXIV shown in FIG. 33.
Figure 35:
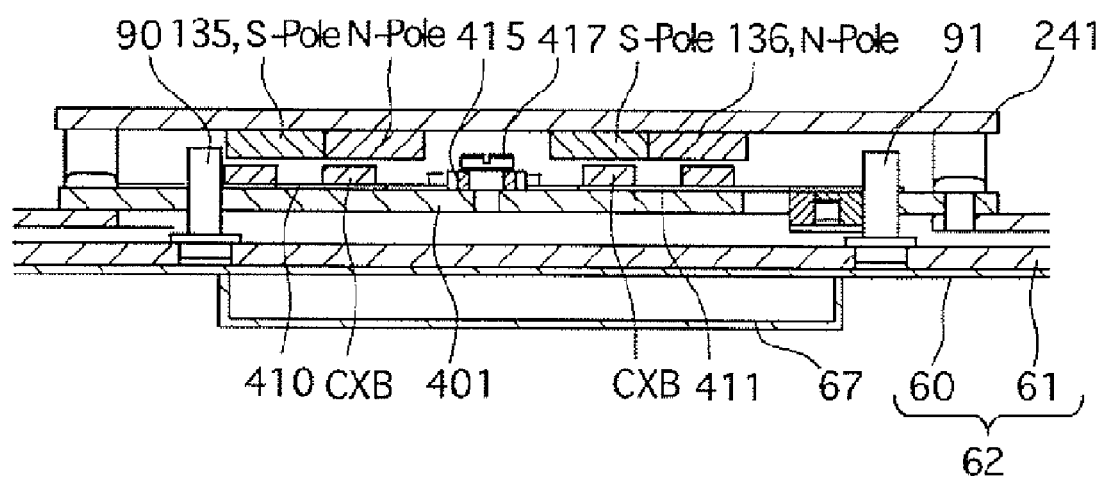
FIG. 35 is a cross sectional view of the lock mechanism taken along the XXXV-XXXV line shown in FIG. 33.

A sixth embodiment of a lock mechanism 600 of the present invention will be described hereinafter with reference to FIG. 30. Note that the construction of the digital camera 20 and the construction of the camera-shake correction apparatus 30 of the sixth embodiment are the same as those in the first embodiment. Furthermore, since the structure of the lock mechanism 600 of the sixth embodiment is similar to the lock mechanism 400 of the fourth embodiment, like members are designated with like numerals and detailed descriptions of such members are omitted.

A front yoke 601 of the lock mechanism 600 is made from a magnetic material such as soft iron and has a general shape which substantially the same as that of the front yoke 401 of the fourth embodiment. The front yoke 601 is provided with four square holes 205 which are formed in the vicinity of four corners of the front yoke 601. Furthermore, the rear stationary support board 32 is provided with four insertion holes (square through-holes) 92 which correspond to the four square holes 205 and have the size and shape as the four square holes 205, respectively. A left side portion of the rear surface of the movable stage 62 (rear surface of the reinforcing plate 61) is provided with a pair of upper and lower engaging pins 90, and a right side portion of the rear surface of the movable stage 62 (rear surface of the reinforcing plate 61) is provided with a pair of upper and lower engaging pins 91. The upper and lower engaging pins 90 extend through the upper and lower left insertion holes 92 and the corresponding upper and lower left square holes 205, and the upper and lower engaging pins 91 extend through the upper and lower right insertion holes 92 and the corresponding upper and lower right square holes 205.

A lock member 610, which corresponds to the lock member 410 of the fourth embodiment, is provided with a pair of approximately half-circular shaped upper and lower lock-engaging grooves 612 which are formed on the left edge portion thereof. Similarly, a lock member 611, which corresponds to the lock member 411 of the fourth embodiment, is provided with a pair of approximately half-circular shaped upper and lower lock-engaging grooves 613 which are formed on the right edge portion thereof. The pair of upper and lower lock-engaging grooves 612 disengageably engage with upper and lower engaging pins 90, respectively, and the pair of upper and lower lock-engaging grooves 613 disengageably engage with upper and lower engaging pins 91, respectively.

The fundamental locking/unlocking operations of the sixth embodiment is the same as that of the fourth embodiment, however, since a total of four engaging pins 90 and 91 and a total of tour lock-engaging grooves 612 and 613 are employed during a locking operation, the four engaging pins 90 and 91 can be locked more firmly and stronger than the two engaging pins 90 and 91 of the first through fifth embodiments.

Note that the first through fifth embodiments can he modified so as to provide four engaging pins 90 and 91 instead of two, and corresponding lock-engaging grooves can also be provided.

Furthermore, a number of engaging pins other than two or four (e.g., three) can be provided in an alternative embodiment. For example, the sixth embodiment can be modified by replacing the right lock member 611 with the right lock member 411 of the fourth embodiment, and only one right engaging pin 91 can be provided so as to have a total of three pins 90 and 91. According to this construction, a stronger and firmer locking state can be achieved compared to the case of using only two engaging pins, and reduction in the number of members compared to that of the sixth embodiment can be achieved.

A seventh embodiment according to the present invention will be described hereinafter with reference to FIGS. 31 through 35. Note that the construction of the digital camera 20 and the construction of the camera-shake correction apparatus 30 of the seventh embodiment are the same as those in the first embodiment (the insertion hole 93 and the square hole 206 are the same as those of the second embodiment), and the lock mechanism (400) is the same as that of the fourth embodiment (the resilient engaging portion (the support member 235, the lock-engaging member 237, the cover member 239 and the compression springs S3) is the same as that of the second embodiment), and like members are designated with like numerals and detailed descriptions of such members are omitted. Furthermore, since the operations of each member in the seventh embodiment has already been described in the previous embodiments, duplicate descriptions of such operations have been omitted.

Accordingly, by providing a resilient engaging portion (the support member 235, the lock-engaging member 237, the cover member and the compression springs S3), likewise with the second embodiment, since the lock-engaging member 237 is slidably movable in the X-direction and is resiliently supported by the compression springs S3, even if the assembled positions of the engaging pins 90 and 91 or the support member 235 and lock-engaging member 237 are a little out of alignment compared to the positions designated at the design stage, when the lock member 411 is moved to the engaged position, the lock-engaging groove 238 of the lock-engaging member 237 can still be securely engaged with the engaging pin 91.

Furthermore, by changing the biasing force of the compression springs S3, when the lock member 411 is moved to the engaged position, the lock-engaging groove 238 can be made to engage with the engaging pin 91 with a stronger force, and it is also possible to not only make the lock-engaging groove 238 engage with the engaging pin 91 but also the lock-engaging groove 224.

Although the present invention has been described with reference to the above first through seventh embodiments, the present invention is not limited thereto, and various modifications of the above described embodiments are possible.

For example, although the lockmembers 110, 111,210, 211, 310, 3117 410, 411, 610 and 611 are biased to move toward the disengaged position by the extension springs S1 or S2, an alternative biasing device can be used. For instance, compression springs can be alternatively used to bias these lock members.

In addition, the driving device for moving each lock member can alternatively be a motor or an piezoelectric element.

Furthermore, the shape of each lock-engaging groove and lock-engaging member 237 (lock-engaging groove 238) are not limited to the half-circular shape described above. Furthermore, the engaging members which can be used are not limited to the engaging pins 90 and 91; any other protrusions having a rectangular/square columnar shape or protrusions having an alternative sectional shape can be used so long as such protrusions are engageable with the lock-engaging grooves or lock-engaging member 237 (lock-engaging groove 238). Moreover, the lock-engaging grooves of the first through seventh embodiments can have a shape other than a half-circular shape, e.g., a V-shape.

Furthermore, the lock-engaging member 237 is supported via the compression springs S3, which extend/contract in the moving direction (x-direction) of the left and right lock members 210 and 211, 310 and 311, and 410 and 411, so as to provide a smooth movement of the lock-engaging member 237, however, a resilient member(s) other than the compression springs S3, e.g., a rubber member, can be alternatively used to bias the lock-engaging member 237.

Furthermore, a resilient engaging portion having a resilient member and an engaging member integrally formed therewith can be constructed by forming a spring plate into an M-shape so that the central portion thereof forms a lock-engaging groove (238), and fixing this (resiliently deformable) M-shaped spring plate onto one of the left and right lock members 410 and 411.

Furthermore, it is possible to provide the movable stage 62 at two edges thereof with a pair of bent pieces which extend parallel to the optical axis O, a lock hole provided in each of the bent pieces, and a pair of lock pins which disengageably engage with each lock hole, respectively, in a direction parallel to the movable stage 62, wherein the lock pins are supported by a driving device which moves the lock pins via a biasing device such as compression springs, etc. In this case the lock holes constitute engaging members and the lock pins constitute lock members.

An image pickup device other than a CCD (CCD 65) can be used, e.g., a CMOS imaging sensor can of course be alternatively used.

Furthermore, a convention camera-shake (hand-shake) correction apparatus which only linearly moves the movable stage 62 in the X-direction and the Y-direction can be applied to the lock mechanism 100 of the present invention, or a stage apparatus (an apparatus in which a specific member is linearly movable in the x-direction and/or Y-direction, or rotatable) having a different usage to that of a camera-shake correction apparatus can be applied to the lock mechanism 100 of the present invention.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lock mechanism for a stage apparatus, comprising:
   a movable stage which is provided on a stationary member which is movable in a reference plane;
   a pair of engaging members which are provided on said movable stage;
   a pair of lock members which are positioned between said engaging members and are movable so as to move toward and away from corresponding said engaging members;
   a lock driving device which moves said lock members to an engaged position wherein said lock members mutually move away from each other and engage with said corresponding engaging members; and
   an unlock driving device which moves said lock members to a disengaged position wherein said lock members mutually move toward each other so as to disengage with said corresponding engaging members.

2. The lock mechanism for the stage apparatus according to claim 1, wherein said lock members are movable in a direction along a straight line passing through both of said engaging members.

3. The lock mechanism for the stage apparatus according to claim 2, further comprising an interconnecting device which interconnects said lock members with each other;
   wherein said interconnecting device moves one of said lock members to said engaged position when the other of said lock members moves to said engaged position, and moves said one of said lock members to said disengaged position when said other of said lock members moves to said disengaged position.

4. The lock mechanism for the stage apparatus according to claim 3, wherein said interconnecting device comprises:
   a link member which is rotatable on an axis extending normal to said reference plane; and
   a pair of mounting axes which extend normal to said reference plane, wherein one and the other end portions of said link member are mutually and rotatably mounted to said one and the other said lock members via said mounting axes, respectively.

5. The lock mechanism for the stage apparatus according to claim 3, wherein said interconnecting device comprises:
   a pair of cam slots respectively formed in said one and the other lock members, wherein at least a portion of said pair of cam slots overlap each other in a direction normal to said reference plane; and
   a cam pin which is slidably inserted through both of said pair of cam slots so as to be relatively movable therein.

6. The lock mechanism for the stage apparatus according to claim 3, wherein said interconnecting device comprises:
   a pair of racks which are respectively formed on one and other of facing edges of said one and the other lock members, said pair of racks extending in directions parallel to said moving direction of said lock members; and
   a pinion gear which is rotatable on an axis extending normal to said reference plane and meshes with said pair of racks.

7. The lock mechanism for the stage apparatus according to claim 1, wherein said lock driving device comprises:
   a magnetic-force generator provided on said stationary member;
   a drive coil fixed to each of said lock members, respectively, wherein upon receiving electric current while receiving a magnetic force from said magnetic-force generator, each said drive coil generates a linear drive force in a direction along a straight line passing through both of said engaging members.

8. The lock mechanism for the stage apparatus according to claim 3, wherein said lock driving device comprises:
   a magnetic-force generator provided on said stationary member;
   at least one drive coil fixed to at least one of said lock members, wherein upon receiving electric current while receiving a magnetic force from said magnetic-force generator, said drive coil generates a linear drive force in a direction along a straight line passing through both of said engaging members.

9. The lock mechanism for the stage apparatus according to claim 1, wherein said unlock driving device comprises:
   a biasing device which exerts a biasing force on said lock members toward said disengaged position.

10. The lock mechanism for the stage apparatus according to claim 1, further comprising:
    a first retaining device for holding said lock members at said engaged position upon said lock members being moved to said engaged position; and
    a second retaining device for holding said lock members at said disengaged position upon said lock members being moved to said disengaged position.

11. The lock mechanism for the stage apparatus according to claim 10, wherein said first retaining device comprises a plunger provided therein with an electromagnet and a permanent magnet;
wherein when said movable stage is in a non-operational state, said lock members are held at said engaged position by a magnetic force from said permanent magnet; and
wherein when said movable stage is in an operational state, said magnetic force of said permanent magnet is cancelled out by a magnetic force of said electromagnet.

12. The lock mechanism for the stage apparatus according to claim 10, wherein said second retaining device comprises:
a biasing device which exerts a biasing force on said lock members toward said disengaged position.

13. The lock mechanism for the stage apparatus according to claim 1, wherein said pair of engaging members are provided on said movable stage at positions aligned on a straight line which passes through a center of gravity of an integral movable body which includes said movable stage and other members integral therewith.

14. The lock mechanism for the stage apparatus according to claim 1, wherein said stage apparatus is provided in a digital camera and said movable stage is provided on a front surface thereof with a rectangular shaped image pickup device; and
wherein said pair of engaging members are provided on said movable stage so as to be aligned on a substantially diagonal line which extends across said rectangular shaped image pickup device.

15. The lock mechanism for the stage apparatus according to claim 1, further comprising at least another engaging member provided on said movable stage in addition to said pair of engaging members;
wherein said pair of lock members are positioned between said pair of engaging members and said another engaging member, and are provided with lock-engaging grooves for engaging and disengaging with corresponding each of said pair of engaging members and said another engaging member; and
wherein the number of said lock-engaging grooves corresponds with a total number of said pair of engaging members and said another engaging member.

16. A lock mechanism for a stage apparatus, comprising:
a movable stage which is provided on a stationary member which is movable in a reference plane;
a pair of engaging members which are provided on said movable stage;
a pair of lock members provided in between said engaging members, said lock members being movable in a direction along a straight line passing through both of said engaging members, wherein said lock members include a pair of engaging portions which disengageably engage with corresponding said engaging members;
a lock driving device which moves said lock members to an engaged position wherein said lock members mutually move away from each other and engage with said corresponding engaging members upon said movable stage entering a non-operational state; and
an unlock driving device which moves said lock members to a disengaged position wherein said lock members mutually move toward each other so as to disengage with said corresponding engaging members so that said movable stage enters an operational state;
wherein one of said engaging portions comprises a resilient engaging portion which is resiliently deformable, wherein when said movable stage is in said non-operational state, a distance from said resilient engaging portion to a corresponding said engaging member is shorter than a distance between said engaged position and said disengaged position; and
wherein upon an operation of said lock driving device, said resilient engaging portion engages with said corresponding engaging member while resiliently deforming.

17. The lock mechanism for the stage apparatus according to claim 16, wherein said resilient engaging portion comprises:
a movable engaging portion which disengageably engages with said corresponding engaging member, said movable engaging portion being supported on said lock member via a resilient member.

18. The lock mechanism for the stage apparatus according to claim 17, further comprising an interconnecting device which interconnects said lock members with each other;
wherein said interconnecting device moves one of said lock members to said engaged position when the other of said lock members moves to said engaged position, and moves said one of said lock members to said disengaged position when said other of said lock members moves to said disengaged position.

19. The lock mechanism for the stage apparatus according to claim 18, wherein said interconnecting device comprises:
a pair of racks which are respectively formed on one and other of facing edges of said one and the other lock members, said pair of racks extending in directions parallel to said moving direction of said lock members; and
a pinion gear which is rotatable on an axis extending normal to said reference plane and meshes with said pair of racks.

20. The lock mechanism for the stage apparatus according to claim 16, wherein said lock driving device comprises:
a magnetic-force generator provided on said stationary member; and
at least one drive coil fixed to at least one of said lock members, wherein upon receiving electric current while receiving a magnetic force from said magnetic-force generator, said drive coil generates a linear drive force in a direction along a straight line passing through both of said engaging members.

21. The lock mechanism for the stage apparatus according to claim 16, further comprising:
a first retaining device for holding said lock members at said engaged position upon said lock members being moved to said engaged position; and
a second retaining device for holding said lock members at said disengaged position upon said lock members being moved to said disengaged position.

* * * * *